United States Patent
Herget et al.

(10) Patent No.: US 12,296,459 B2
(45) Date of Patent: *May 13, 2025

(54) MOBILE PRINTING ROBOT AND RELATED METHODS

(71) Applicant: Dusty Robotics, Inc., Mountain View, CA (US)

(72) Inventors: Philipp Josef Herget, Sunnyvale, CA (US); Tessa Ann Lau, Sunnyvale, CA (US); Shih-Chieh Hsiung, Santa Clara, CA (US)

(73) Assignee: DUSTY ROBOTICS, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/401,114

(22) Filed: Dec. 29, 2023

(65) Prior Publication Data

US 2024/0131721 A1  Apr. 25, 2024

Related U.S. Application Data

(63) Continuation of application No. 16/691,413, filed on Nov. 21, 2019.

(60) Provisional application No. 62/900,278, filed on Sep. 13, 2019, provisional application No. 62/885,681, filed on Aug. 12, 2019, provisional application No. 62/885,679, filed on Aug. 12, 2019, provisional application No. 62/837,273, filed on Apr. 23, 2019,
(Continued)

(51) Int. Cl.
*B25J 11/00* (2006.01)
*B25J 5/00* (2006.01)
*B25J 9/16* (2006.01)

(52) U.S. Cl.
CPC .......... *B25J 11/0075* (2013.01); *B25J 5/007* (2013.01); *B25J 9/1684* (2013.01)

(58) Field of Classification Search
CPC ....... B25J 11/0075; B25J 5/007; B25J 9/1684
See application file for complete search history.

(56) References Cited

U.S. PATENT DOCUMENTS

| 4,371,881 A | 2/1983 | Bork |
| 4,875,291 A | 10/1989 | Panique |
| 5,453,931 A | 9/1995 | Watts, Jr. |

(Continued)

FOREIGN PATENT DOCUMENTS

| JP | 2001289638 A | 10/2001 |
| JP | 2009078193 A | 4/2009 |

(Continued)

OTHER PUBLICATIONS

U.S. Appl. No. 16/691,413 Claim set (Year: 2023).*
(Continued)

*Primary Examiner* — Khoi H Tran
*Assistant Examiner* — Nhi Q Bui
(74) *Attorney, Agent, or Firm* — PATENT LAW WORKS LLP

(57) ABSTRACT

A mobile printing robot prints layouts or other construction information on a construction surface. Support is provided for precise line navigation in a single pass or parallel passes. A firing pattern of an array of printing nozzles may be selected to compensate for lateral errors in position. The mobile printing robot may also print fiducial marks as an aid for navigation.

15 Claims, 20 Drawing Sheets

Related U.S. Application Data provisional application No. 62/770,271, filed on Nov. 21, 2018.

(56) References Cited

U.S. PATENT DOCUMENTS

| | | | |
|---|---|---|---|
| 5,467,273 A | 11/1995 | Faibish et al. | |
| 5,755,072 A | 5/1998 | Lingafelter | |
| 5,974,348 A | 10/1999 | Rocks | |
| 6,142,602 A | 11/2000 | Tanaka | |
| 6,954,635 B2 | 10/2005 | Kim et al. | |
| 7,806,493 B2 | 10/2010 | Gazeau et al. | |
| 8,417,383 B2 | 4/2013 | Ozick et al. | |
| 9,800,757 B2 | 10/2017 | Fujimoto et al. | |
| 10,268,202 B1* | 4/2019 | Casale | G05D 1/0282 |
| 2003/0041098 A1 | 2/2003 | Lortz | |
| 2003/0117652 A1 | 6/2003 | Lapstun | |
| 2003/0210294 A1 | 11/2003 | Fredrickson | |
| 2004/0210319 A1 | 10/2004 | Lapstun et al. | |
| 2007/0100496 A1* | 5/2007 | Forell | G05D 1/024 701/23 |
| 2009/0277031 A1 | 11/2009 | Stocking | |
| 2010/0143089 A1 | 6/2010 | Hvass et al. | |
| 2010/0156988 A1 | 6/2010 | Kimura | |
| 2010/0215216 A1 | 8/2010 | Hong et al. | |
| 2011/0007113 A1 | 1/2011 | Katano | |
| 2011/0043515 A1 | 2/2011 | Stathis | |
| 2012/0200626 A1 | 8/2012 | Orr | |
| 2012/0239224 A1 | 9/2012 | McCabe | |
| 2013/0044160 A1 | 2/2013 | Ronk | |
| 2014/0163775 A1 | 6/2014 | Metzler | |
| 2014/0176634 A1 | 6/2014 | Rimai | |
| 2014/0209020 A1 | 7/2014 | Burke | |
| 2014/0350886 A1* | 11/2014 | Metzler | G01S 7/003 702/150 |
| 2015/0042716 A1* | 2/2015 | Beier | B41J 11/00216 347/14 |
| 2015/0231897 A1 | 8/2015 | Noell | |
| 2015/0271991 A1* | 10/2015 | Balutis | G05D 1/0221 700/264 |
| 2015/0377605 A1 | 12/2015 | Bridges | |
| 2016/0063717 A1 | 3/2016 | Sasaki | |
| 2017/0066132 A1 | 3/2017 | Casey | |
| 2017/0131398 A1 | 5/2017 | Younis | |
| 2018/0107969 A1 | 4/2018 | Trivelpiece et al. | |
| 2018/0216941 A1 | 8/2018 | Zhu et al. | |
| 2018/0267552 A1 | 9/2018 | Artes et al. | |
| 2018/0281012 A1* | 10/2018 | Telleria | B24B 49/12 |
| 2018/0361585 A1 | 12/2018 | Williams et al. | |
| 2019/0196492 A1 | 6/2019 | Casale et al. | |
| 2019/0240912 A1 | 8/2019 | Alves | |
| 2019/0242728 A1 | 8/2019 | Low | |
| 2019/0255551 A1* | 8/2019 | Hargadon | G05D 1/0274 |
| 2019/0381529 A1* | 12/2019 | Schaumberger | B05B 9/0413 |
| 2020/0117213 A1 | 4/2020 | Tian | |
| 2020/0130004 A1* | 4/2020 | Le Strat | B05B 12/04 |
| 2020/0338580 A1 | 10/2020 | Herget | |
| 2020/0408520 A1 | 12/2020 | Jensen | |
| 2021/0363708 A1* | 11/2021 | Hassidov Pleser | G05D 1/027 |
| 2022/0091581 A1 | 3/2022 | Herget | |
| 2022/0128667 A1 | 4/2022 | Hu | |
| 2022/0219184 A1 | 7/2022 | Bustgens | |
| 2022/0351011 A1 | 11/2022 | Hassidov Pleser | |

FOREIGN PATENT DOCUMENTS

| | | | |
|---|---|---|---|
| JP | 2009096057 A | 5/2009 | |
| JP | 2017015523 A | 1/2017 | |
| JP | 2019031901 A | 2/2019 | |
| JP | 2019196978 A | 11/2019 | |
| KR | 101071109 B1 | 10/2011 | |
| WO | 2015066461 A1 | 5/2015 | |
| WO | 2018025268 A1 | 2/2018 | |
| WO | 2020167299 A1 | 8/2020 | |

OTHER PUBLICATIONS

Extended European Search Report for EP Application No. 20852609.5, mailed Jul. 14, 2023, 40 pgs.

Communication Pursuant to Article 94(3) EPC for EP Application No. 20795759.8, mailed Aug. 3, 2023, 6 pgs.

Extended European Search Report for EP Application No. 20863150.7, mailed Sep. 5, 2023, 25 pgs.

Extended European Search Report for EP Application No. 20795759.8, issued Nov. 18, 2022, 9 pgs.

International Preliminary Report on Patentability for PCT/US2020/050594, mailed Mar. 24, 2022, 6 pgs.

International Preliminary Report on Patentability for PCT/US2020/045994, mailed on Feb. 24, 2022, 9 pgs.

International Preliminary Report on Patentability for PCT/US2020/029592, filed Apr. 23, 2020, mailed Nov. 4, 2021.

International Search Report and Written Opinion for PCT/US2020/050594, mailed Dec. 8, 2020, 10 pgs.

Pierlot et al., "BeAMS: a Beacon based Angle Measurement Sensor for Mobile Robot Positioning," IEEE Transactions on Robotics, 30(3):533-549, Jun. 2014, 17 pgs. https://orbi.uliege.be/bitstream/2268/153647/1/Pierlot2014BeAMS.pdf.

International Search Report and Written Opinion, dated Nov. 4, 2020, for PCT/US2020/045994, International Filing Date Aug. 12, 2020, 14 pgs.

International Search Report and Written Opinion for PCT/US20/29592, filed Apr. 23, 2020, mailed Jul. 16, 2020, 20 pgs.

Communication Pursuant to Article 94(3) EPC for EP Application No. 20795759.8, mailed Jan. 2, 2024, 6 pgs.

International Search Report and Written Opinion issued for PCT/US24/27312, mailed on Oct. 2, 2024, 15 pgs.

Communication pursuant to Article 94(3) EPC, for EP Application No. 20795759.8, issued by European Patent Office on Jun. 5, 2024, 9 pgs.

Notice of Reasons for Refusal for Japanese Patent Application No. 2022-516236, issued by Japan Patent Office on Jul. 23, 2024, 5 pgs.

U.S. Appl. No. 16/691,413 Claim set (Year: 2024).

U.S. Appl. No. 18/401,114 Claim set (Year: 2024).

Examination Report issued by IP Australia for application No. 2020261399 on Nov. 30, 2024, 6 pgs.

* cited by examiner

MOBILE PRINTING ROBOT AND RELATED METHODS

CROSS-REFERENCE TO RELATED APPLICATIONS

This application is a continuation of U.S. patent application Ser. No. 16/691,413, filed Nov. 21, 2019, which claims priority to U.S. Provisional Application Ser. No. 62/900,278, filed Sep. 13, 2019, U.S. Provisional Application Ser. No. 62/885,681, filed Aug. 12, 2019, U.S. Provisional Application Ser. No. 62/885,679, filed Aug. 12, 2019, U.S. Provisional Application Ser. No. 62/837,273, filed Apr. 23, 2019, and U.S. Provisional Application Ser. No. 62/770,271, filed Nov. 21, 2018, each of which are hereby incorporated herein in their entirety by this reference.

TECHNICAL FIELD

The present disclosure is related to mobile robot technology. More particularly, the present disclosure is related to mobile robots that can print markings on a horizontal surface.

BACKGROUND

Mobile robots can be used for a variety of applications. One environment in which mobile robots could be used is space such as a construction jobsite, where a mobile robot could perform a variety of functions in the environment. One such application is the printing of drawings, text, or other markings on a surface such as the concrete floor of a building under construction.

One of the challenges to building such a mobile printing robot is the precision at which the robot must deliver the markings. In the construction application, precision of less than $\frac{1}{16}$" (1.6 mm) is generally required. Mobile robot positioning is generally not this precise. The commonly-accepted algorithm for determining a robot's position ("localization") inside a space uses sensor readings (typically LiDAR) of the robot's distance from known landmarks such as walls. However, even top-of-the-line LiDAR units only report distance to within centimeter (cm) accuracy, limiting a robot's ability to determine its own position precisely.

The current practice of construction layout is to hire human crews to lay out building components, such as walls, ducting, and wiring, by physically marking the flooring surface. Locations are referenced off of plans generated by an architect, and delivered to the jobsite typically in large rolls of blueprints or in digital form on tablet computers. The typical layout process comprises using measuring tape to measure out distances from known landmarks such as concrete pillars, and tensioning chalk-covered string between two pins to mark straight lines. Other markings are done by annotating the surface using adhesive sticky dots, cans of spray paint, or permanent markers. Because human labor is expensive and error-prone, markings are generally limited to the basic information needed for subsequent labor crews to install framing and drywall, heating, ventilation, and air conditioning (HVAC), electrical wiring, plumbing or fixtures at marked locations.

SUMMARY

A mobile printing robot prints features on a construction surface, such as a horizontal surface of a construction site. The mobile robot may be used to print a layout, but more generally it may also print lines, symbols, letters, numbers, and fiducials. A state estimator utilizes available location information from onboard sensors to determine a position and orientation of the mobile robot. The state estimator also determines position and orientation based on any additional available information from more accurate information sources, such as an absolute positioning device or fiducials. In some embodiments, the mobile printing robot prints fiducials for later use in determining position and orientation of the mobile printing robot. In some embodiments, the mobile printing robot monitors its location and synchronizes the printing of each new row of pixels in an image with the movement of the mobile printing robot. In some embodiments, a firing pattern of an array of nozzles is selected to compensate for a lateral offset in a location of the mobile printing robot. In some embodiments, the mobile printing robot uses a point-to-point navigation for general navigation but switches to path navigation for printing linear strips. In some embodiments, the mobile robot prints fiducials on a construction surface, stores the location of the fiducials, and later uses the fiducials to determine its precise location when other external position information sources, such as an absolute positioning device, are unavailable.

DETAILED DESCRIPTION

Exemplary Mobile Printing Robot System

Figure 1A:
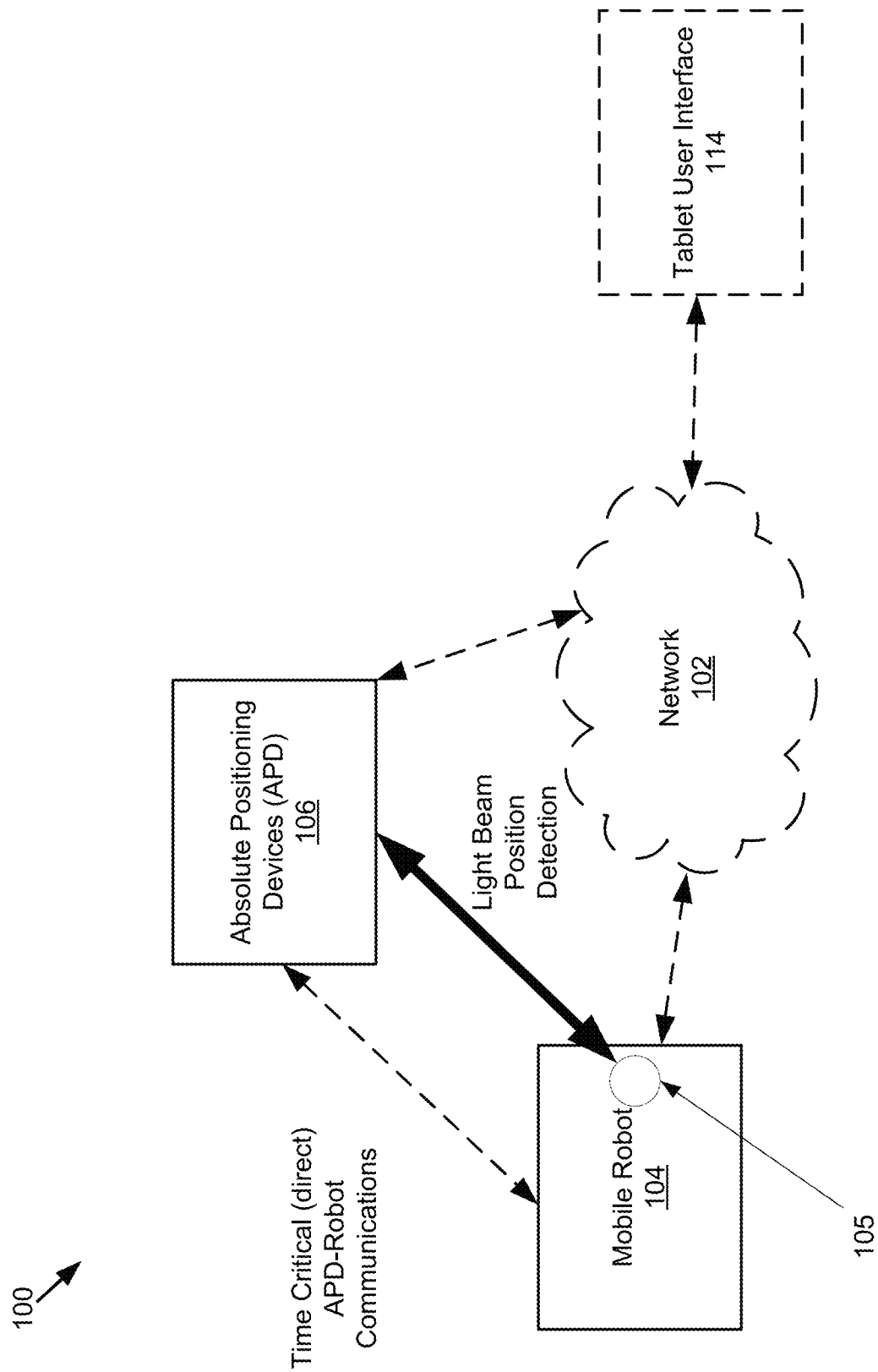
FIGS. 1A, 1B, and 1C illustrate an embodiment of a mobile printing robot system.

FIG. 1A is a high-level block diagram of a mobile robot printing system 100 in accordance with an embodiment.

Figure 1B:
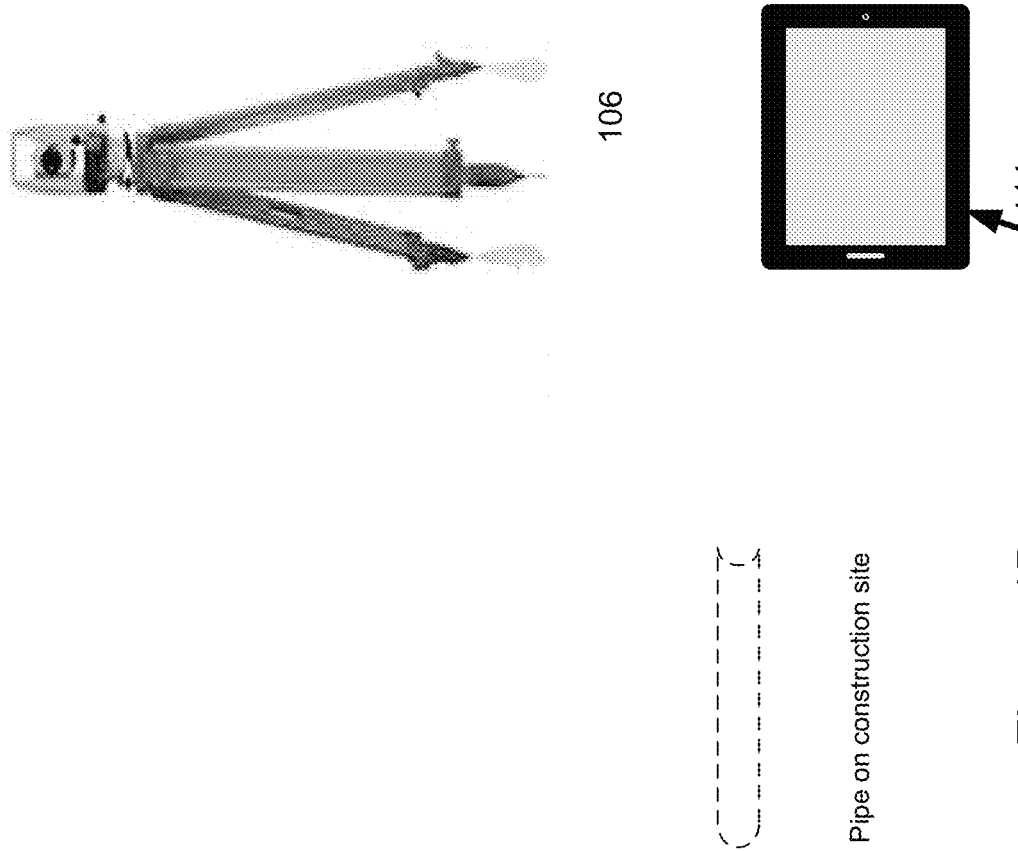
Figure 1B:
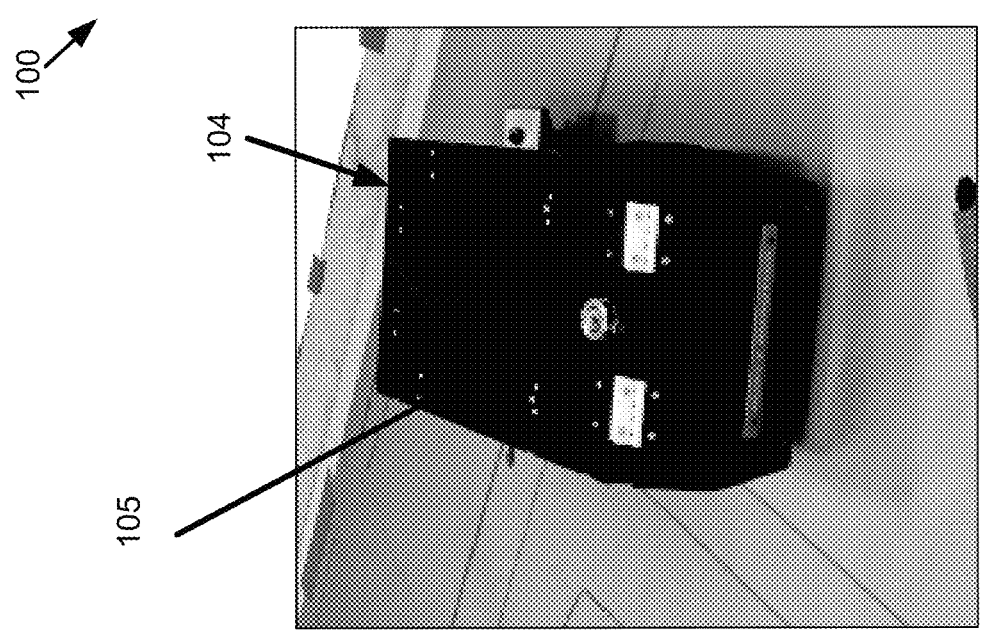
Figure 1C:
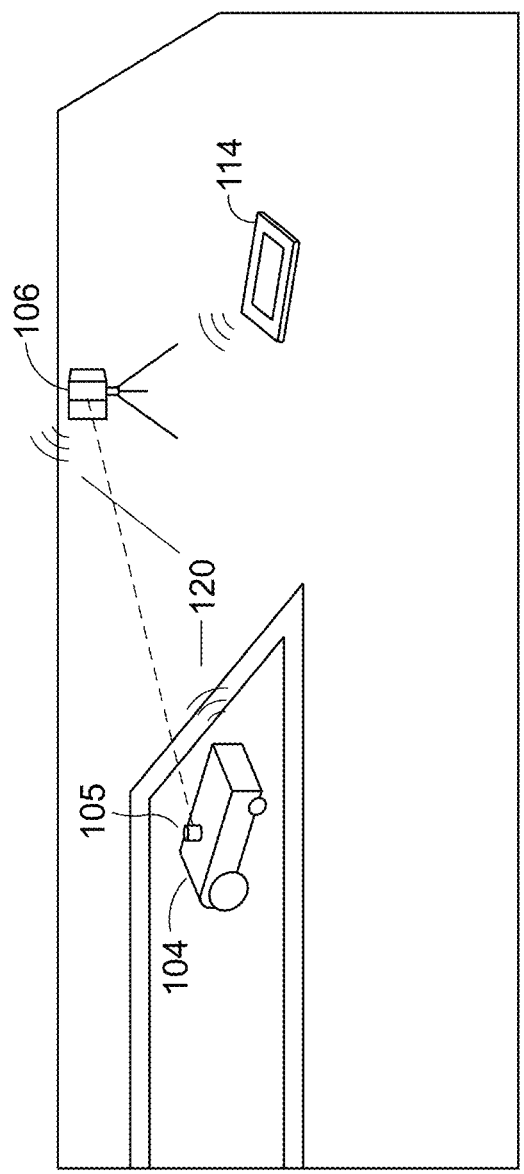

FIGS. 1B and 1C illustrate perspective views of the mobile robot printing system 100. In one implementation, a mobile robot printing system 100 comprises a mobile robot 104. The mobile robot 104 includes hardware and software to navigate around a construction site and print on a construction surface. (e.g., a horizontal surface of a construction site, which for example, may be a concrete floor of a construction site)

One use of mobile robot 104 is to move around in a construction environment and print or otherwise form markings at specific locations. For example, a mobile robot 104 in one embodiment is a mobile printing robot that autonomously navigates and prints building layouts. For example, the mobile robot may print a building layout on a floor (e.g., a concrete surface) corresponding to an architect's plans for how a building is to be constructed. More generally, the mobile printing robot 104 may print other information on the floor besides a building layout.

In one embodiment, one or more absolute positioning devices (APD) 106 are provided that have a capability to accurately determine position/location. Some examples of APD approaches include a radio position measurement solution, such as those made by the Humatics Corporation. Other examples of APD approaches includes optical position measurement solutions approach, such as the HTC Vive®. In one embodiment, the APD comprises a total station or laser tracker that measures the angles and distance from the APD 106 to a point on mobile robot 104. This information permits an accurate determination of the location of the mobile robot 104. As one example, the APD 106 may be a total station that measures angles and distance. A Total Station (TS) is a type of APD 106 comprising a laser rangefinder on an actuated two axis gimbal, which generates a laser beam that reflects off a reflective device such as a prism. A TS typically uses an electronic transit theodolite in conjunction with electronic distance meter (EDM). It is typically integrated with microprocessor, electronic data collector and storage system. It measures the sloping distance of object to the instrument, including horizontal angles and vertical angles. In one embodiment, the TS includes a laser tracker to track a reflector mounted on the mobile robot.

A TS measures both the distance to the reflector as well as two angles of the reflector relative to the base station. Using these three measurements, the location of the reflector can be calculated relative to the location of the TS. Thus, assuming a TS is positioned at a given location in the building, the reflector's position in the building can be determined with respect to the location of the TS.

For example, a total station may be mounted on a tripod at a selected height above a construction surface. This then permits the total station to calculate horizontal and vertical angles to a point on the mobile robot 104, along with a distance measurement. From that information, an accurate determination of the absolute position of the mobile robot is calculated.

While a total station is one example of an APD, it will be understood that other optical or RF devices that determine angles and distance to a point on the mobile robot 104 may be used.

In one embodiment, the APD 106 measures the robot's location by using a laser, to detect the location of a reflector, prism, or similar retroreflective device 105, which can be affixed to the robot 104.

In one embodiment, a laser beam of the APD 106 transmits a laser beam that is directed in a line-of-sight path towards the retroreflective device 105 as shown as a dashed line in FIG. 1C.

In some embodiments, the APD 106 automatically tracks the movement of the mobile robot 104 such that it generates a series of position/location readings for the mobile robot 104.

The retroreflective device 105 may be any optical element or set of elements that reflects light back to its source over at least a certain range of angles, sometimes called a field of view, although there are other terms used in the optics art. In classical optics, a three-corner mirror having three faces is an example of a retroflector. However, some prisms are retroreflective over a range of angles. There are also optical devices that have a set of facets that are retroreflective over a range of angles. There are also certain classes retroreflective materials, such as certain retroreflective coatings. Some total stations also integrate with active reflectors having multiple sets of corner reflectors along with active electronics to prevent the total station from locking onto other reflective surfaces, such as safety vests. In some implementations, an active reflector is used in combination with the robot for accurate position measurements.

The retroreflective device 105 may be implemented as a 360-degree retroreflective device. Alternatively, it may have a narrower field of view but be rotated during use towards the APD to maintain a lock.

The measured location is communicated to the robot via a wireless communication network 120. There are many different ways that the measured location information may be communicated. However, a low-latency and low variable latency communication link is desirable. This is because there are various tradeoffs between the velocity of the mobile robot, the desired printing accuracy, and the effect of latency in the receipt of location information being useful to improving the accuracy of the printing of the mobile robot 104. For example, suppose the mobile robot 104 moves at a velocity of one m/s. That would, in turn, mean that a 1 ms communication delay would correspond to a 1 mm distance traveled by the mobile robot. If the objective was to achieve on the order of 1 mm printing line accuracy, then in this example the time delay in receiving the location information would be coming later in time than would be ideal for controlling the movement of the mobile robot 104. In some implementations, the controller of the mobile robot predicts a current location. For example, the mobile robot can handle long time in receiving location information by predicting its current location based on received instances of position data and associated timestamps.

The communication link 120 may use an existing network such as Wi-Fi™ However, Wi-Fi™ can be subject to large delays in some locations, such as in cities in which there is a lot of Wi-Fi™ communication near a construction site. LPWAN (Low Power Wide Area Network) communication protocols such as Sigfox and LoRa, or other low frequency wireless communication protocols are possibilities. LoRa uses spread spectrum techniques to minimize interference. A local direct optical link is another possibility, such as using a separate laser beam (or Light Emitting Diode) to communicate location information on a direct link A direct local radio frequency link is another possibility. In any case, a variety of different network communication technique or a direct communication channel using a radio or optical connection may be used as the communication link between the APD 106 and the robot 104.

In some embodiments, non-time sensitive information may be communicated using a different communication link. For example, a conventional wireless link, such as a Wi-Fi™ network link may be used to communicate non-time sensitive information.

In one embodiment, an optional portable device having a user interface 114, such as a tablet computing device having a user interface 114, may communicate with the mobile robot 104. In some embodiments, the optional portable device 114 may also be in communication with the APD 106.

In one embodiment, a user or operator of the mobile robot 104 uses the user interface 114 of the portable device to access information related to the status of the mobile robot 104, access building information of a building information model (BIM) or CAD model, or enter commands to the mobile robot.

The BIM or CAD model generally contains all information about the building including the line segments providing the outline of the walls to be built and the walls that are already existing in the site. This BIM or CAD can be used to generate a map on which the robot navigates and contains a set of obstacles that the robot expects to encounter when drawing the wall outlines onto the floor.

Also, as construction proceeds, there may be a variety of obstacles present on the construction site that cannot be generated from the BIM. This can include obstacles to the safe movement of the mobile robot, such as pallets left on the construction site. But it may also include other aspects of the construction, such as piping, wiring, etc.

The presence of obstacles may also prevent the use of an APD 106 requiring a direct line-of-sight. For example, if the mobile robot 104 moves behind a post, a pallet left on the construction site, or a wall, then an APD based on a line-of-sight may become temporally ineffective.

Figure 2:
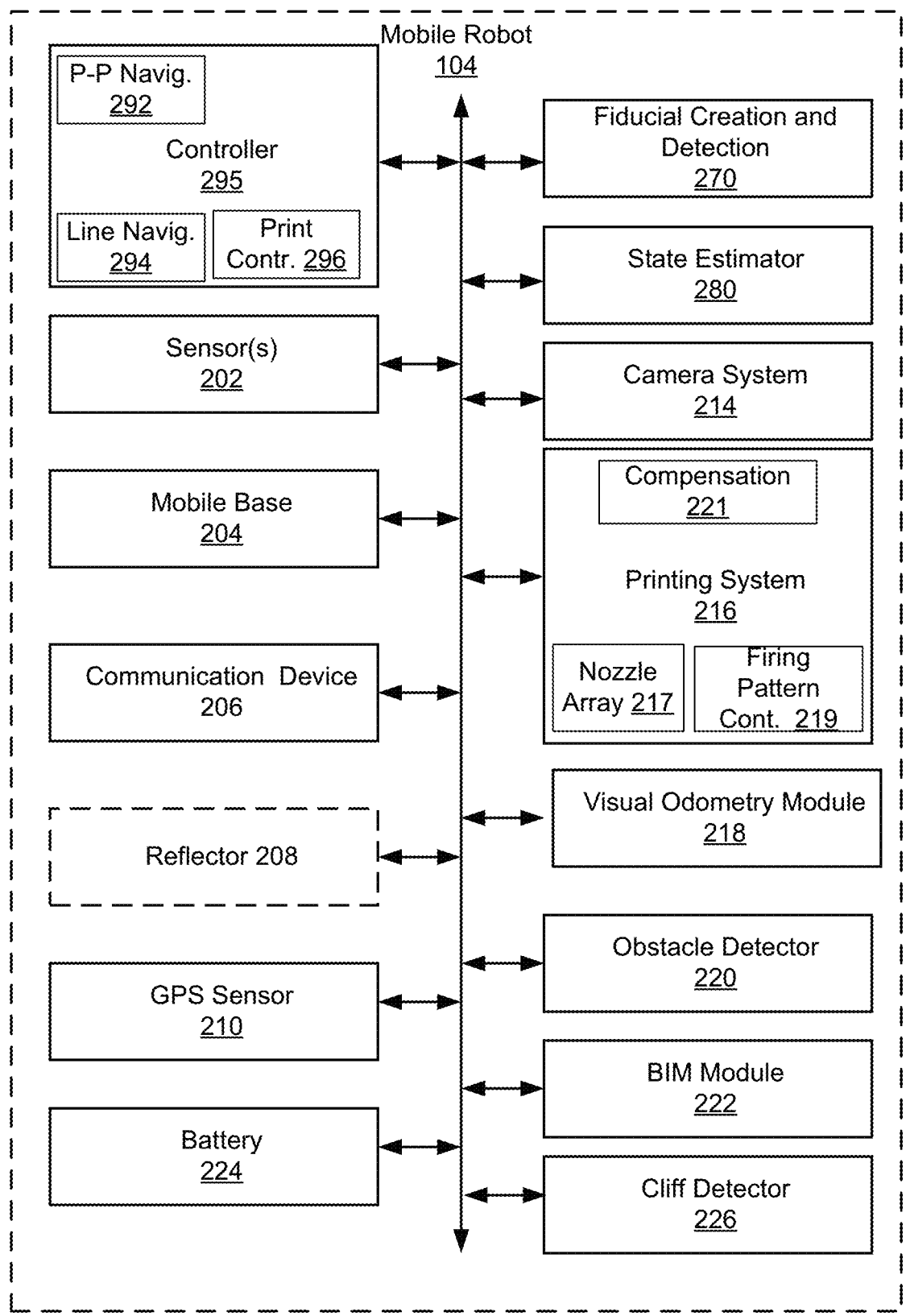
FIG. 2 is a block diagram of a mobile robot in accordance with an embodiment.

As shown in FIG. 2, one implementation of the mobile robot 104 comprises a controller 295; one or more sensors 202, one of which may be an IMU, accelerometer, gyroscope, or compass; a mobile base 204 including features, such as motors and wheels to move the mobile robot; a communication device 206; a reflector 208, a GPS sensor 210, a battery 224, a cliff detector 226, a BIM module 222 to access BIM or CAD data, an obstacle detector 220 (which may include a depth camera or a lidar), a visual odometry module 218, a printing system 216, a camera system 214 having one or more cameras, a state estimator 280, and a fiducial creation and detection module 270. In one embodiment, the communication device 206 implements a wireless communication link with the APD 106 and/or the optional portable device 114.

In one embodiment, controller 295 includes a point-to-point navigation controller 292, a line navigation controller 294, and a print controller 296. The point-to-point navigation controller utilizes a control technique to navigate between two points, such as points "A" and "B" but does not define a fixed path to get from "A" to "B." In point-to-point navigation, there is no rigid constraint requiring the mobile robot to precisely move in a straight line from A to B. This mode of navigation has a variety of advantages, including allowing the mobile robot to efficiently navigate around obstacles. In one embodiment, the line navigation controller 294 is a path following controller. For example, a fixed path between points "C" and "D" for the line navigation controller 294 to follow is selected. For example, a path between points C and D may include a straight line, curved line, or combinations of straight lines and curved lines. In one embodiment, the path following controller is used to perform printing passes.

In one embodiment, the printing system 216 includes an array of spray nozzles 217 and a firing pattern controller 219 that determines a firing pattern for the array of spray nozzles. The firing pattern may include a selection of a subset of spray nozzles that are activated to, for example, compensate for lateral drift of the mobile robot from a planned navigation path. In one embodiment a compensation module 221 is provided to receive information (e.g., velocity, position error, or other information) to determine a compensation to be made to printing. The compensation can include a transverse print correction. The transverse print correction may include a transverse correction to the firing pattern. However, more generally, the transverse print correction may include other mechanisms, described below in more detail, to translate a print head (for a movable print head) or select a different print head (if more than one print head is included in the mobile robot. In one embodiment, the compensation includes defining a firing pattern that includes a timing sequence to determine when the spray nozzles are turned on.

In one embodiment, the system 100, the robot 104 uses the camera data from camera, lidar, or depth camera to track its relative position in the building and periodically receives updates with total station data to remove the drift from the camera data and provide corrections to its position estimate.

In some implementations, a state estimator 280 combines available location information to generate an estimate of the most likely position of the mobile robot at a given time based on combining information from all available sources. This can also be described as 'sensor fusion" in that the state estimator 280 generates an estimate of the most likely position and orientation of the mobile robot that takes into account the latency of each data source, the accuracy limitations of each data source, and information over a previous window of data. For example, an APD 106 may provide accurate location information but be subject to communication time delays of network 102 or generate data infrequently. Also, an APD 106 may be temporarily unavailable if the line of sight is temporarily lost, such as when the mobile robot moves behind a post, a wall, or an obstacle. Local sensors 202 and 218 may have less latency than an APD, but may also be less accurate, particularly if relied upon for an extended period of time. GPS sensor 210 may be capable of providing location data in some construction sites but not others.

The state estimator 280 generates a best estimate of the mobile robot location and orientation that takes into account the availability and limitations of different types of data, as well as information on a sequence of recent location measurements. For example, the state estimator 280 may use a sensor fusion algorithm based on statistical weighting techniques.

The robot's onboard sensors 202, 210, and 214 track its own location. Sensors 202 may include any common robot sensors including Lidar, radar, time of flight, depth or other 3D cameras, sonars, etc. For example, cameras 214 may be mounted on the robot 104 in various directions to observe its environment and determine its position as it moves. A visual odometry module 218 supports visual odometry. One technique of particular interest is using algorithms known in the state of the art under the term "visual odometry" (VO). These algorithms track the relative motion of an object using the motion of images captured by the camera system 214. Since these systems track relative motion, they are accurate over short to medium distances, but suffer from slow drift when tracking over larger distances.

The mobile base 204 may be implemented using a variety of different drive technologies, including holonomic implementations with omni-directional wheels and non-holonomic implementations in which the wheels are not omni-directional. Non-holonomic drive systems, such as with differential 2-wheel drive, sometimes known as a differential wheeled robot (DWR), are typically cheaper to implement than a robot with true omni-directional drive (e.g., "omni" wheels or "Mecanum" wheels). However, DWR implementations have more difficulties achieving precise navigation. In some implementations, the navigation is switched from point-to-point navigation to line navigation when conducting a printing pass.

In one implementation, the robot 104 relies primarily on data from an APD 106 when available, and onboard sensors 202 when absolute position information is not available. For example, a mobile robot 104 navigating on a construction site may have line of sight to a TS temporarily occluded by a concrete pillar as it drives past the pillar. Using this implementation, a robot 104 could calculate its location using the TS while it's visible, fall back on visual odometry using its visual odometry module 218, or other sensors, while the visual connection is lost, and resume use of the TS-based location once it reappears in view.

In some implementations, the robot 104 uses the images from multiple cameras 214 to create a very precise estimate of its movement through the space. For example, the robot 104 may have a downward facing camera located at the front and back of the body 204, and/or at the two side edges of the robot 104. In this configuration, each camera needs enough magnification to resolve the fine detail in the driving surface. As an example, the fine detail of the grains in the cement can be used to uniquely identify a location. This can be done with any surface that requires layout markings, as long as the surface has enough detailed features. Examples include cement, tile, wood, or temporary floor coverings such as Ram Board.

In some implementations, a fiducial creation and detection module 270 is used to coordinate actions of the mobile robot to generate fiducials (e.g., fiducial marks) and later use the printed fiducials. As an example, a fiducial may be used to aid the mobile robot to compute its precise location.

In one embodiment, the robot 104 moves in the forward direction, images collected from the back camera are compared to images collected by the front camera at the same location. By finding the precise alignment between the two images, and knowing the precise distance between the two cameras, the robot 104 can measure the distance it has moved between acquiring the two images. Similarly, by observing the motion as measured by the left and right cameras, the robot can track its angular orientation precisely.

In one implementation, a printing robot 104 also comprises a detector 220 that detects the presence of obstacles. Any number of sensors commonly used in robotics for obstacle detection can be employed. Some examples include 3D depth cameras such as the Intel RealSense, time of flight sensors, 2D LiDAR, sonar, radar, signal point optical sensors, or mechanical sensors used for bumper and mechanical collision detection. Sensors can also be employed to detect a cliff such as an empty elevator shaft, stairway, or edge of a building where the walls are not yet constructed. When the robot detects an obstacle, the robot may choose to drive around the obstacle such that the area under the obstacle is not printed on. If the obstacle is large it may not continue in that portion of the building. It may also notify an operator about the presence of the obstacle such that it can be cleared and a good print quality can be achieved. For small holes such as penetrations, the robot can drive over the obstacle such that its wheels straddle the penetration, allowing it to print an alignment mark over the penetration so the location of the penetration can later be checked.

General information on the lines and other features to be drawn may be obtained from the Building Information Models (BIM), CAD, or other architectural drawings. These may be represented in many forms, such as a Revit model, or a DXF or DWG file. However, they may also be represented in any proprietary file containing a list of lines or other objects.

The features to be drawn may include combinations of lines, letters, numbers, and symbols. For example, in some implementations, the lines and features correspond to images to be printed by a printhead of the print system. A printhead permits printing not only lines, but letters, numbers, and symbols. This permits, for example, a line to be drawn along with any letters, numbers, or symbols that be useful at a construction site. The determination of the features to be drawn may be processed by another computing entity and then received by the mobile printing robot controller.

However, more generally, a version of this relevant BIM/drawing information may be stored in the controller 295 along with information corresponding to an obstacle map. In some implementations, this version may include two files with the first file describing the lines to be drawn and the second file describing obstacles to be avoided. For example, the obstacle map may include features derived from the BIM/drawing information as well as additional obstacle information collected on the construction site. The lines to be drawn may be a subset of the lines in the BIM that represent one layer or one area to be printed.

In one application of mobile printing robot technology, a robot 104 is used to generate markings on a horizontal surface of a building under construction, where such markings correspond to information extracted from a digital model of the building under construction, such as architectural drawings, Building Information Models (BIM), or Shop Drawings created by individual trades. Such drawings are typically drawn up by architects or others who design the building to be built. In current practice, these drawings are typically printed on large sheets of paper and given to workers in the field, who have the responsibility for marking pertinent information from the drawings onto the surface of each floor under construction. These marks may take the form of lines (e.g. to denote the locations of framing tracks for interior walls), points (e.g. to denote locations where ductwork will be hung from the ceiling or recessed lighting is to be installed), or text (e.g. to distinguish where fire-rated vs regular drywall is to be hung).

A mobile printing robot 104 that generates the correct markings on the surface must first extract the pertinent information from a digital model, such as using an Application Programming Interface (API) to access the model, or by reading the model into memory and extracting features and points of interest from the model. This extraction may be done on a robot, or it may be done in a separate computing system, such as the tablet computer 114, or located offsite or in the cloud, and communicated to the robot using some form of network. For example, this may be done by a BIM module 222 that is operational on the robot 104, or it may be done by a BIM server (now shown) located on the same network 102 as the robot 104.

During the construction process, the BIM model may be changed to reflect changes in the desired design of the building, or to accommodate conflicts observed during the building process. When these changes occur, it is desired to update the markings on the floor so that the construction crews work off of the latest information. In one implementation, a mobile printing robot 104 is able to update previous markings by first covering the surface with like-colored material (such as concrete-colored paint) and then generating a new set of markings on top of the colored material, effectively "erasing" the original markings and replacing them with new ones. In another implementation, a mobile printing robot 104 keeps track of the markings that have previously been generated, compares the old markings against the current set of markings, and only erases and re-generates the markings in areas where there is a difference between the old and the new markings. In one implementation, a robot uses a camera or other sensing device to perceive the old markings on the floor for comparison with the desired markings. In another implementation, a robot remembers what has been previously printed, and compares its memory of the previous printing run with the new markings that are to be printed, in order to calculate the areas to be erased and re-printed.

Figure 3:
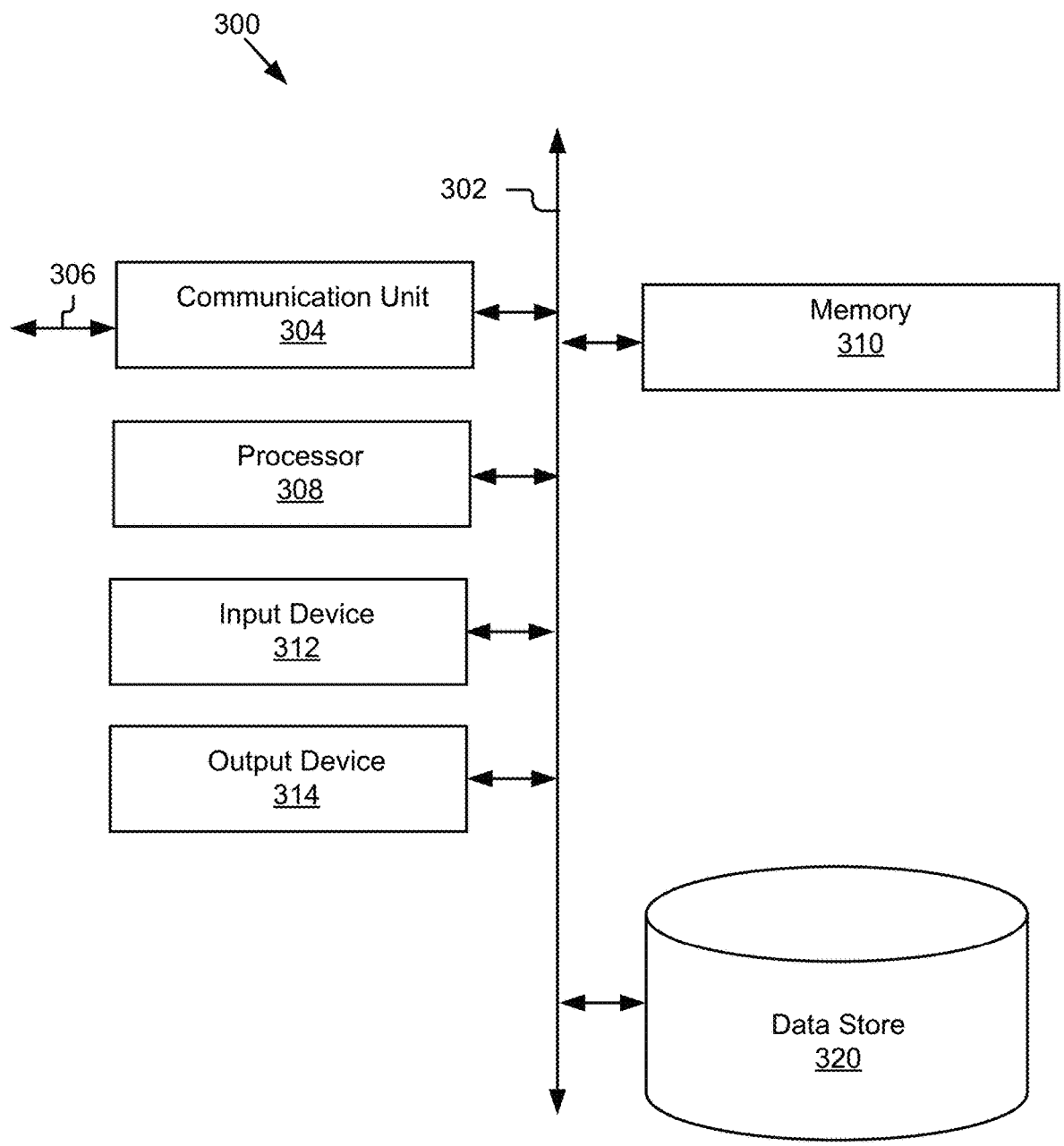
FIG. 3 is a block diagram of a computing system in accordance with an embodiment.

FIG. 3 is a block diagram of an example computing device 300, which may represent a computing device configured to implement modules depicted in FIGS. 1A and 2, depending on the implementation.

As depicted, the computing system 300 may include a processor 308, a memory 310, a communication unit 304, an output device 314, an input device 312, and a data store 320, which may be communicatively coupled by a communication bus 302. The computing system 300 depicted in FIG. 3 is provided by way of example and it should be understood that it may take other forms and include additional or fewer components without departing from the scope of the present disclosure. For instance, various components of the computing device may be coupled for communication using a variety of communication protocols and/or technologies including, for instance, communication buses, software communication mechanisms, computer networks, etc. While not shown, the computing system 300 may include various operating systems, sensors, additional processors, and other physical configurations. The processor 308, memory 310, communication unit 304, etc., are representative of one or more of these components.

The processor 308 may execute software instructions by performing various input, logical, and/or mathematical operations. The processor 308 may have various computing architectures to method data signals (e.g., CISC, RISC, etc.). The processor 308 may be physical and/or virtual, and may include a single core or plurality of processing units and/or cores. In some implementations, the processor 308 may be coupled to the memory 310 via the bus 302 to access data and instructions therefrom and store data therein. The bus 302 may couple the processor 308 to the other components of the computing system 300 including, for example, the memory 310, the communication unit 304, the input device 312, the output device 314, and the data store 320.

The memory 310 may store and provide data access to the other components of the computing system 300. The memory 310 may be included in a single computing device or a plurality of computing devices. In some implementations, the memory 310 may store instructions and/or data that may be executed by the processor 308. For example, the memory 310 may store instructions and data, including, for example, an operating system, hardware drivers, other software applications, databases, etc. which may implement the techniques described herein. The memory 310 may be coupled to the bus 302 for communication with the processor 308 and the other components of computing system 300.

The memory 310 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 308. In some implementations, the memory 310 may include one or more of volatile memory and non-volatile memory (e.g., RAM, ROM, hard disk, optical disk, etc.). It should be understood that the memory 310 may be a single device or may include multiple types of devices and configurations.

The bus 302 can include a communication bus for transferring data between components of a computing device or between computing devices, a network bus system including the network 102 or portions thereof, a processor mesh, or combination thereof, etc. In some implementations, various components operating on the computing device 300 (operating systems, device drivers, etc.) may cooperate and communicate via a communication mechanism included in or implemented in association with the bus 302. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 304 may include one or more interface devices (I/F) for wired and wireless connectivity among the components of the system 100. For instance, the communication unit 304 may include, but is not limited to, various types of known connectivity and interface options. The communication unit 304 may be coupled to the other components of the computing system 300 via the bus 302. The communication unit 304 can provide other connections to the network 102 and to other entities of the system 100 using various standard communication protocols.

The input device 312 may include any device for inputting information into the computing system 300. In some implementations, the input device 312 may include one or more peripheral devices. For example, the input device 312 may include a keyboard, a pointing device, microphone, an image/video capture device (e.g., camera), a touch-screen display integrated with the output device 314, etc. The output device 314 may be any device capable of outputting information from the computing system 300. The output device 314 may include one or more of a display (LCD, OLED, etc.), a printer, a haptic device, audio reproduction device, touch-screen display, a remote computing device, etc. In some implementations, the output device is a display which may display electronic images and data output by a processor of the computing system 300 for presentation to a user, such as the processor 308 or another dedicated processor.

The data store 320 may include information sources for storing and providing access to data. In some implementations, the data store 320 may store data associated with a database management system (DBMS) operable on the computing system 300. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The data stored by the data store 320 may be organized and queried using various criteria including any type of data stored by them. The data store 320 may include data tables, databases, or other organized collections of data.

The data store 320 may be included in the computing system 300 or in another computing system and/or storage system distinct from but coupled to or accessible by the computing system 300. The data stores 320 can include one or more non-transitory computer-readable mediums for storing the data. In some implementations, the data stores 320 may be incorporated with the memory 310 or may be distinct therefrom.

The components 304, 308, 310, 312, and/or 314 may be communicatively coupled by the bus 302 and/or the processor 308 to one another and/or the other components of the computing system 300. In some implementations, the components 304, 308, 310, 312, and/or 314 may include computer logic (e.g., software logic, hardware logic, etc.) executable by the processor 308 to provide their acts and/or functionality. In any of the foregoing implementations, these components 304, 308, 310, 312, and/or 314 may be adapted for cooperation and communication with the processor 308 and the other components of the computing system 300.

Printing and Fiducial Examples

In one implementation the mobile robot 104 contains one or more marking devices, like a spray nozzle, in a fixed location. In another implementation the marking devices are on a single axis stage. However, having few marking devices at a fixed or moving position has downsides. If the marking device (part of a printing system 216) is mounted in a fixed position on a robot 104, then that robot 104 must be positioned at a precise location in order to be able to generate marks at precise locations. Positioning a robot 104 precisely is very challenging and requires extremely precise feedback control systems, which can be challenging and expensive to build. A system with moving spray nozzles also has the disadvantage of requiring a second control system with mechanical limitations.

In one implementation, a robot 104 is designed with a printing component (part of a printing system 216) that enables fast control of the ink locations. With this system, markings are laid down in a precise position even if a robot 104 is not able to control the robot body to the precise location where the markings are to be printed. For example, an inkjet printer head could be used as a printing component. Such a printing component generally comprises a series of nozzles in an array 217 that emit ink, mounted linearly along the length of an assembly, and allowing for electrical actuation of individual print nozzles in the assembly. With the ability to turn on or off one or more print nozzles, a robot 104 that is located with its center proximal to the location where a mark is to be made could electrically control the appropriate nozzles to cause a mark to be generated at the correct precise location.

In a robot printing application, both the velocity and the robots position transverse to the desired path are changing.

In one implementation, a robot comprises an inkjet printing system 216 having a firing pattern controller 219 that receives compensation inputs for both the velocity of the robot (the x position), and the transverse position of the robot with respect to the desired location of the printed features (the y position). When the y position changes, the firing sequence sent to the printheads is shifted proportionally, such that the image lands on the correct area of the floor.

In another implementation a controller 295 includes a print controller 296 that makes printing decisions. In one implementation, it computes or receives information about the position of the robot 104 with respect to the surface the robot 104 is traveling on. For example, the control system may receive position information (e.g., location and orientation) from state estimator 280. The controller 295 uses this information to instruct the firing pattern controller 219 to fire each of the print head nozzles to produce an image on the ground in a specific location.

In another implementation the robot 104 has one or more nozzles mounted on high speed linear actuators, such that the frequency response of the positioning system moving the nozzles is high even though the robot is slow to correct it's position.

In a preferred implementation, a mobile robot 104 includes positioning measurement system (using some combination of APD and VO) and a printing component, such that the measured position of the robot is used to fine-tune the output of the printing component such that a designated pattern of markings is laid on the floor at a precise location as the robot drives past.

In construction layout, one of the most common features is the outlines of the wall segments, which consist of two parallel lines that denote the location of the bottom track used to construct each wall. In yet another implementation the robot 104 is outfitted with two printheads positioned such that each head draws one of the two parallel lines of the wall segments. To print accurately, the robot 104 needs only to control its position within the width of the print head. For example, if the bottom track is 3¼ inches, the robot 104 could be designed with two ½ inch wide print heads spaced at a center to center distance of 3¼ inches. When the robot drives to print the two lines, it needs to keep the printheads over the intended location of the lines. The robot 104 therefore needs to control its position to +/− ¼ inch.

In another implementation, the robot 104 comprises two printheads with one or more of the print heads located on actuators such that the spacing of the heads can be varied. This allows the robot 104 to select between different wall thicknesses. In yet another implementation, the robot 104 comprises two print heads spaced at the center to center distance of a wall, and a third printhead placed between the first two, such that text can be printed inside the wall outline. This third print head may be centered such that the text can be printed in the center of the wall segment.

In another implementation the robot has one or more printheads located near the center of the robot, plus an additional narrow width printhead located at the edge of the robot, preferably outside of the span of the wheels. This configuration allows the robot to print proximate to walls, holes, or other features located on the construction site.

Inkjet print heads come in a variety of widths. The widths typically vary from ¼ inch, to very larger print heads that span several inches. To create images larger than the width of the print head, printers typically create the image using several passes. Using this technique requires precise alignment between each of the passes to render a continuous image. The alignment is typically smaller than the dot pitch of the print head. For example, for a 600 dpi head, the required alignment would be less than 1/600 inch or 42 um. Without this precision the two passes would either be separated by a gap or overlap, leaving a visually distorted image.

However, tolerances of this accuracy would be extremely difficult to achieve in an autonomous mobile robot. Furthermore, these accuracies are not required. For construction layout, the typical required tolerances are greater than 1/16 of an inch or 1.6 mm. However, a robot built for construction level tolerances of 1/16 of an inch will leave visually unappealing features if images are printed in multiple passes. One option to maximize the visual appearance of the robotic printed images is to print continuous features in a single pass.

Figure 4:
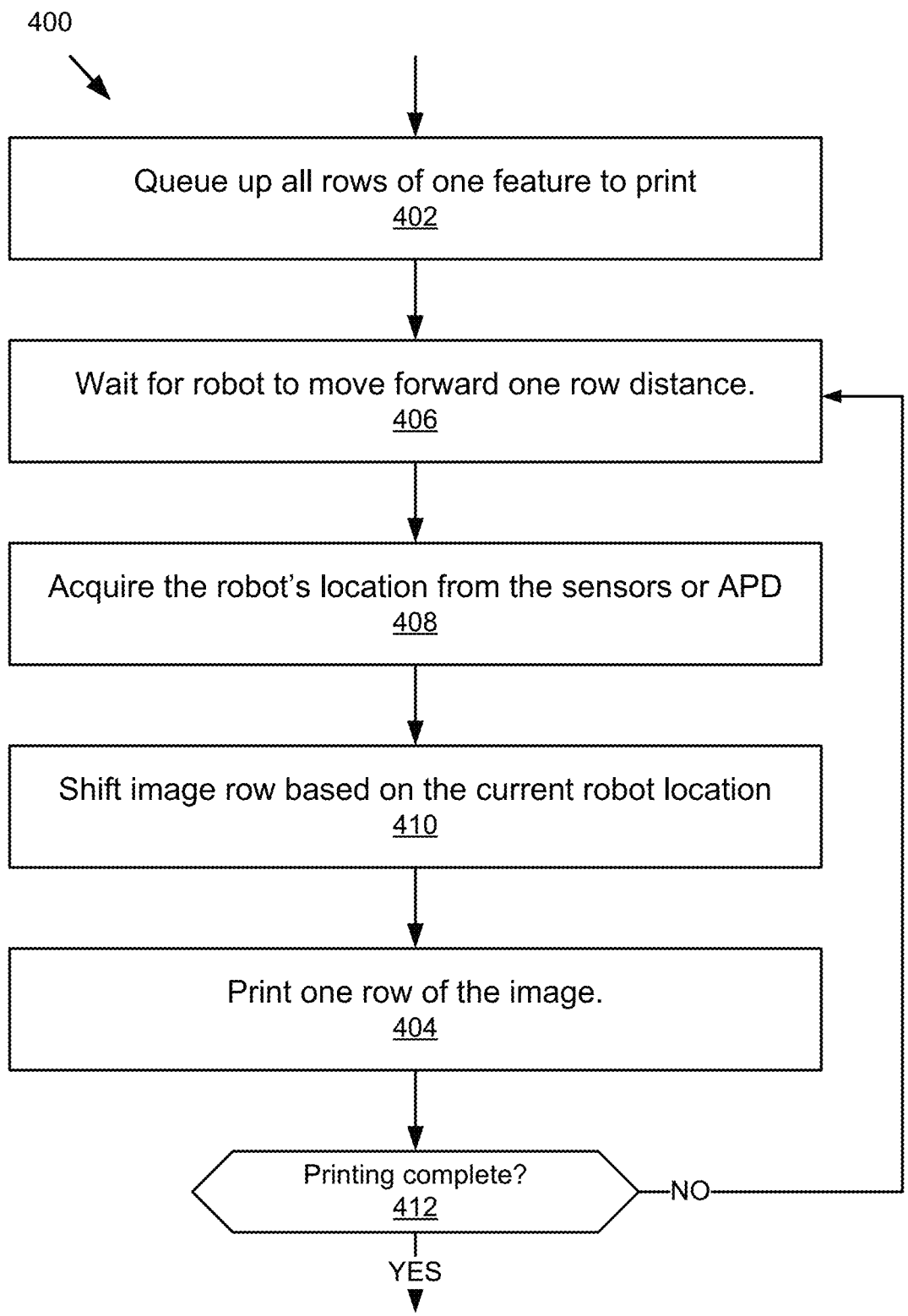
FIG. 4 is a flow chart of a method of printing with a robot in accordance with an embodiment.

One example implementation of a method for printing with a robot is shown in FIG. 4, which may for example be implemented in a print controller 296 of controller 295. An image to be printed has features that are represented as a set of rows of pixels that are printed one row at a time as the robot is moved forward. For example, an image to be printed, in a simple example, a feature that is a straight-line segment has a starting point, an ending point, and a line width. However, more generally the features may be more complex than simple lines. There are different possible technical implementations of an image buffer for an image to be printed. The controller 295 may, for example, have its own image buffer. However, more generally the printing system 216 may receive printing commands and data and have its own local image buffer in which it locally buffers images to be printed.

In block 402, all of the rows of a feature are queued up to print. For example, an image to be printed may correspond to pixels arranged in rows in an image buffer. In block 406, a wait phase may be included to wait for the mobile robot to move forward one row distance. In block 408, the mobile robot's location and orientation may be acquired (e.g., from the sensors, the APD, or the state estimator) to confirm the current location. In block 410, the image row in the image buffer is shifted based on the current robot location. In block 404, one row of the image is printed. In block 412, a determination is made if the printing is completed. If not, the process loops back to block 406. Otherwise the printing completes.

In the example of FIG. 4 the location information is checked prior to printing each row of pixels. This illustrates a basic form of synchronization of the printing of an image with the motion of the mobile robot.

The overall printing may also be organized in a sequence that facilitates accurate printing, such as organizing the printing into a set of single-pass printings. In one implementation, a software extraction process identifies continuous features to be printed in a single pass. Examples include a wall segment, a line of text, or a marking indicating an electrical, plumbing, or HVAC feature. These continuous features are delivered to the robot 104 separately to be printed in one continuous pass. For example, two perpendicular walls would be printed by printing the layout of one wall section in a first pass and then orienting and driving the robot in a perpendicular direction to print the next wall section.

In one embodiment, camera sensors of the mobile robot 104 may also be used in conjunction with "fiducials." The fiducials are objects of known size, shape, or appearance, which are placed at fixed locations in the environment. Fiducials may take many forms, including QR code stickers mounted on the wall, or overturned garbage cans of a known shape and size. Appropriate placement of fiducials may allow a mobile robot 104 to calculate its position relative to these perceived objects in its environment.

In one implementation, the robot 104 additionally includes a means of marking surfaces to allow for operation on surfaces lacking fine detail. In one particular example, the robot 104 prints a pattern on the floor to add detail before any camera takes an image. As an alternative example, the robot could spray ink droplets in front of its path such that they land randomly on the floor. In this manner, fine and random detail can be added to a surface that is otherwise lacking detail.

In one implementation, a mobile robot 104 which has the capability of making marks in its environment may be able to print its own fiducials for use in localization. For example, a robot could use an APD to determine its precise location, and print a distinctive mark on the floor using its onboard printing apparatus. That is, the mobile robot stores a location of a fiducial for an APD location reading. Thus, if at a later time the APD becomes unavailable, the mobile robot can navigate to the fiducials and use the stored APD location information associated with the fiducial.

The marking itself could take the form of a registration mark such as an "X", or it could be a unique identifier containing data such as a QR code or other marking as is known in the art. The location of this unique marking can be stored for later use, or information about the location of the marking could be encoded into the marking itself. This fiducial can later be used in the absence of the APD to inform a mobile robot of its precise location.

In some implementations, the fiducials are printed in a manner invisible to the naked eye. For example, the fiducials could be printed in ink that fluoresces in response to ultraviolet light. Alternatively, the fiducials could be printed in a manner to the human eye and brain, looks like ordinary random white noise, such as by printing the fiducials in a dispersed pattern or having variations in size, shape, texture, and shading that the human eye and brain interprets as meaningless noise.

In one implementation a printing robot 104 places fiducials throughout the construction site and retains data about the location of these fiducials. These fiducials can be located on a regular pattern throughout the floor, such that anywhere a robot 104 is placed, a fiducial is always in view, or always within a particular distance of the robot. In another example however, the fiducials would be placed only in the vicinity of existing layout features on the floor of the site. This could save considerable time in printing large empty rooms as the empty spaces inside the rooms would not need to be printed. Similarly, features can be placed strategically, such that enough features exist for a robot to navigate through the site along certain pathways.

Furthermore, once fiducials have been printed throughout the site, the data associated with these fiducials can be used by many other devices as a precise position reference. Some examples are other robots that perform work, deliver materials, or inspect the construction site including drones and ground based vehicles, virtual reality or augmented reality devices that need to know their precise location, vision based systems for tablets that construction employees use in their daily work, or projection systems that can project BIM model information at the right location on the ground or walls.

The information about the fiducial locations can later be sold or licensed to be used in other devices that require precise indoor localization on the construction site. To protect this information, the fiducials locations can be randomized, or have random offsets around a fixed location, such that the location information is required in order to use the fiducials accurately and unlock the true position information.

Figure 5:
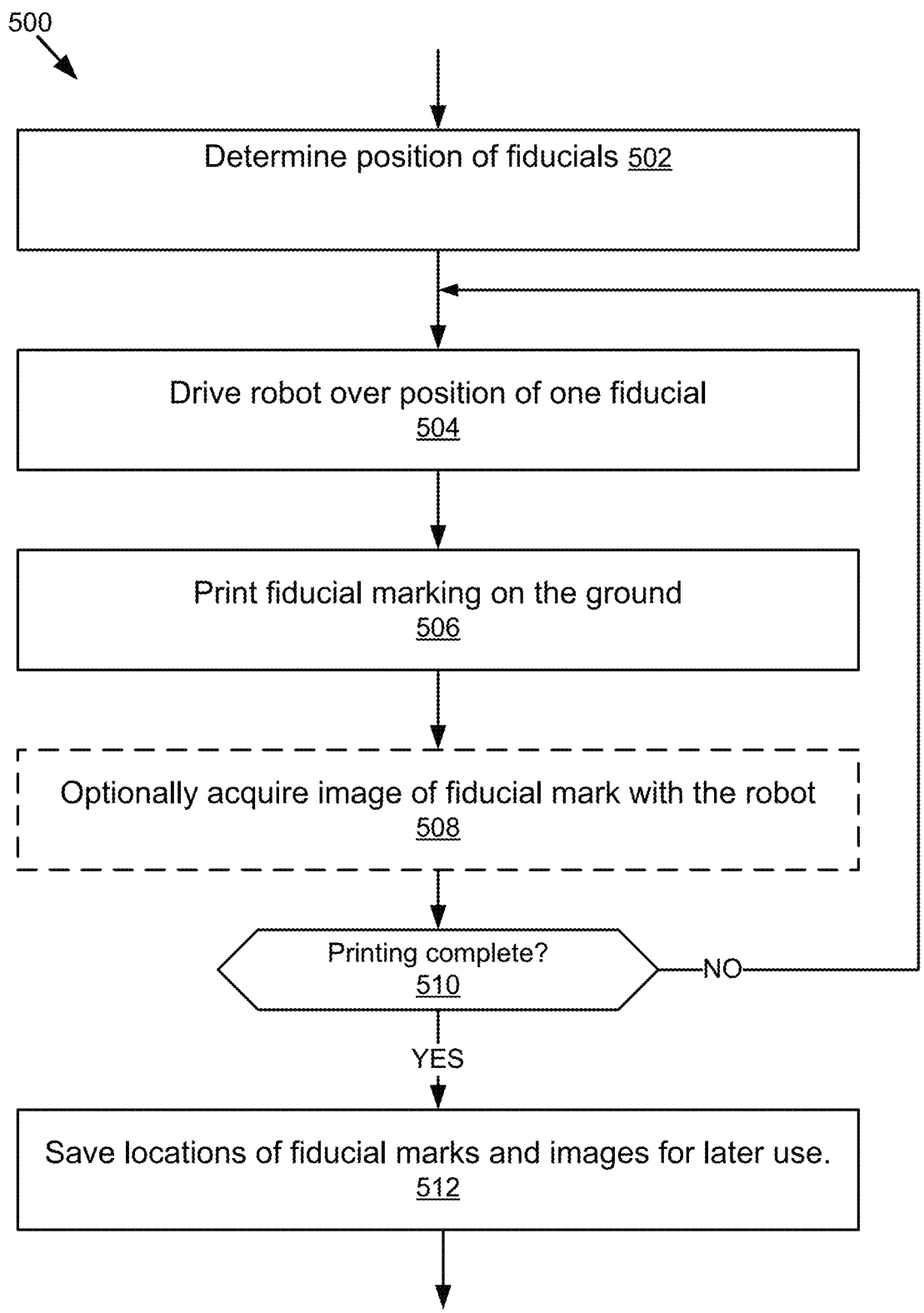
FIG. 5 is a flowchart of a method of printing fiducials in accordance with an embodiment.
Figure 6:
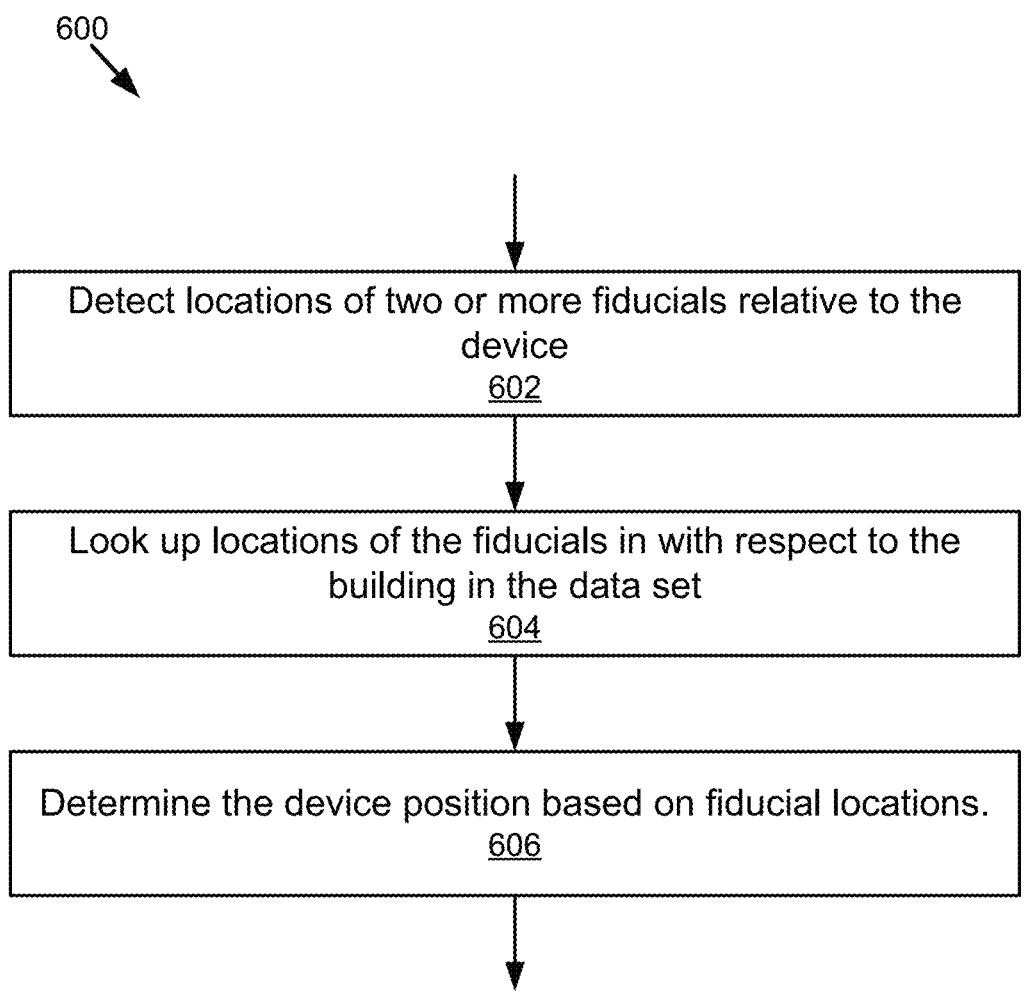
FIG. 6 is a flowchart of a method of detecting fiducials in accordance with an embodiment.

Example implementations of methods for printing and detecting fiducials with a robot are shown and described in FIGS. 5 and 6, respectively. Referring to FIG. 5, in block 502, a desired position for a new fiducial is determined. The fiducial position may have randomized or encoded component. The fiducial position may be located at a preset location. However, more generally, the fiducials may be implemented in simpler formats (e.g., simple non-random/non-encoded formats, such as a cross-shape, such as an "X"). In block 504, the robot is driven over a position of one of the fiducials. In block 506, a fiducial marking is printed on the construction surface. The fiducial marking may optionally have a unique component or attribute (e.g., a different size, different shape, different symbol, different plain-text number, or different randomized or encoded component). In block 508, an option is provided to acquire an image of a fiducial mark with the robot. For example, in some cases, microfeatures in a construction surface (e.g., microfeatures in a concrete surface) may be useful at later time to navigate to the fiducial. In block 510, a determination is made whether the printing is complete. If not, the process loops back to block 504. If the process is complete, the process moves to block 512 to save locations of fiducial marks and images for later use.

In some implementations, the method of FIG. 5 is used for the situation of a mobile robot that prints in place while not moving. For the situation that a mobile robot prints while moving, then steps 504 and 506 are performed in a manner in which the mobile robot is navigated to an initial location and printing of the fiducial occurs while the mobile robot is moving. That is, steps 504 and 506 are substituted with steps to navigate to an initial position and subsequently printing fiducials while driving the mobile robot, as described below in more detail.

Also, it should be noted that in some situations, the mobile robot is given a list of fiducials and prints them on the ground in the correct location. That is, the process of moving a mobile robot to an intended location and printing a fiducial there may be reliable enough to not require determining or saving the location at which the fiducial was actually printed. However, including a step of determining the location of a printed fiducial may be useful to address the possibility of inaccuracies in fiducial printing that could arise from a variety of different causes. Saving a record of the actual fiducial location is one way to address the possibility of potential inaccuracies in fiducial printing.

Referring to FIG. 6, in block 602 the locations of two or more fiducials are detected relative to the mobile robot device. In the most general case, the fiducial could be of any type, encoded or unencoded. In the most general case, each fiducial does not have to be unique in terms of its design. For example, the fiducials could be a set of crosses. The fiducials could also be of different type (e.g., large crosses and smaller crosses). However, there are benefits to each fiducial being unique and/or having encoded information, such as including a unique fiducial number. In block 604, locations of the fiducials are looked up with respect to the building in the building set. In block 606, the mobile robot device position is determined based on the fiducial positions.

Figure 7:
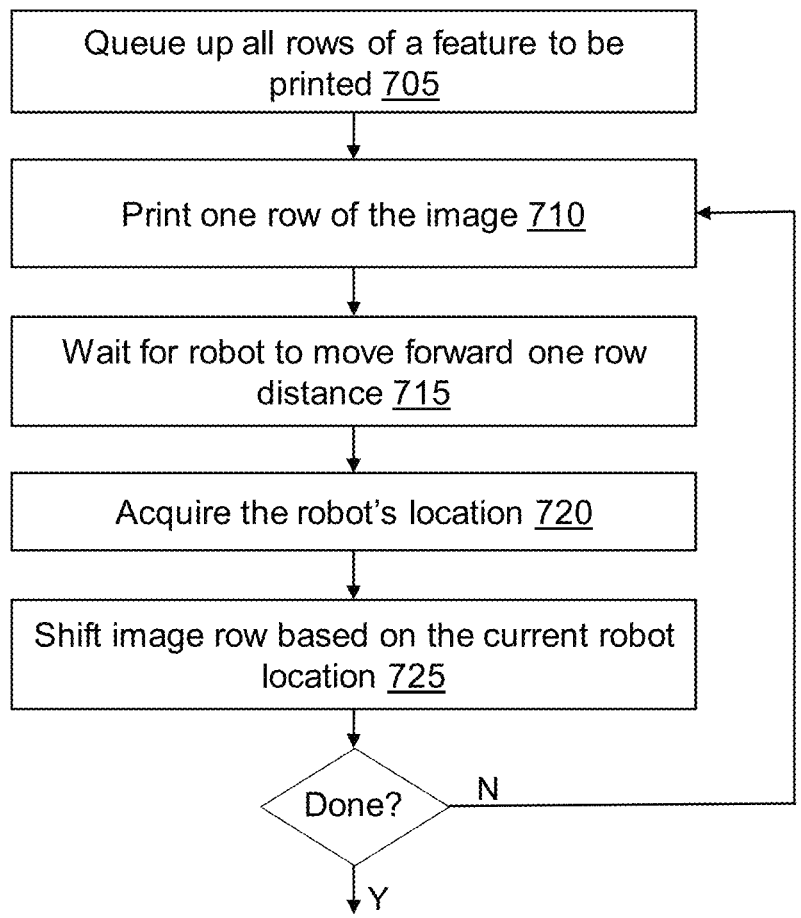
FIG. 7 is a flowchart of a method of printing with a robot in accordance with an embodiment.

FIG. 7 is a flowchart of a method of printing in accordance with an embodiment. In block 705, all of the rows of a feature are queued up to print. In block 710, one of the queued rows of an image feature is printed. In block 715, printing of the next row is paused to wait for the mobile robot to move forward by one row distance. In block 720, the mobile robot acquires the mobile robot's location from the mobile robot's sensors and the APD (if available). For example, the location may be a location determined from sensor fusion of available data sources. In block 725, the image row is shifted based on the current robot location. This process is repeated until all of the queued rows are printed. One way to understand the method of FIG. 7 is that the mobile robot uses the available information (e.g., from sensor fusion) to confirm that it is a proper position to print each subsequent row of the image after the first row is printed.

Figure 8:
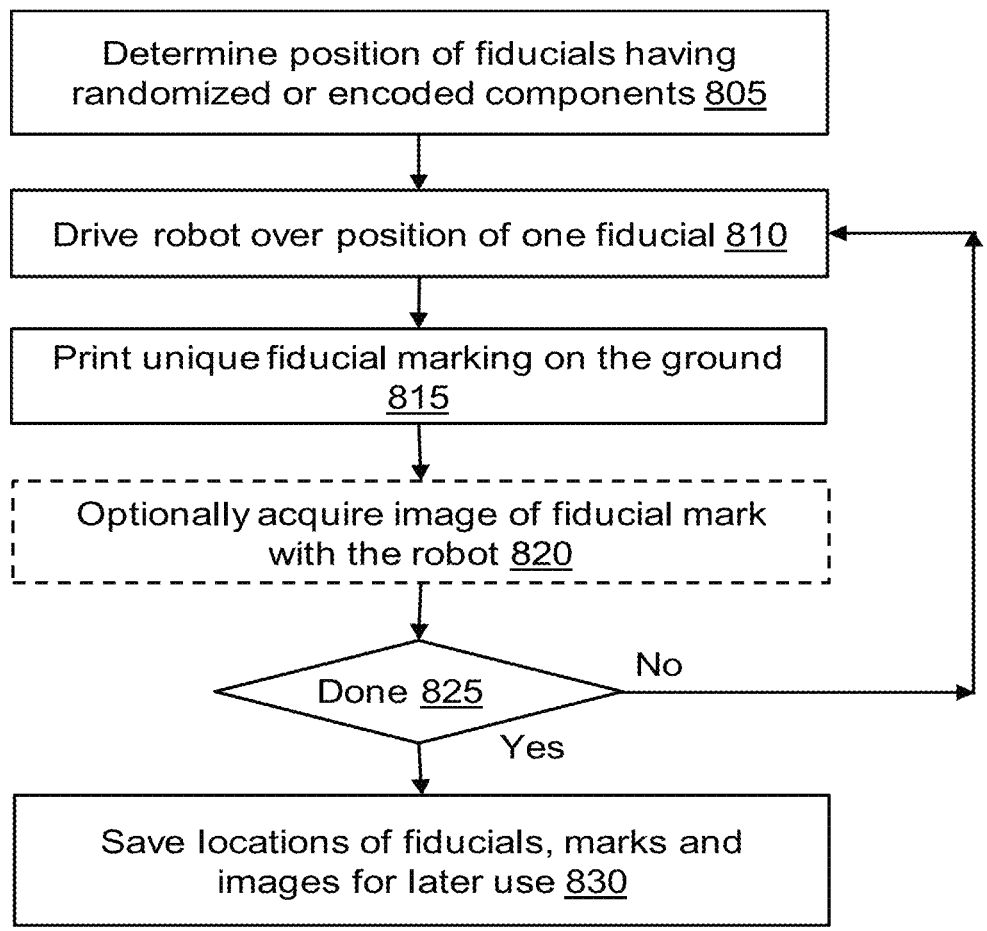
FIG. 8 is a flowchart of a method of printing encoded fiducials in accordance with an embodiment.

FIG. 8 is a flowchart of a method of printing encoded fiducials that supports recording images of the fiducial marks. In block 805, positions of the fiducials are determined in which the fiducials have randomized or encoded components. In block 810, the robot is driven over the position of a fiducial that is to be printed. In block 815, a unique fiducial is printed on the ground at the selected position. In block 820, an option is provided to acquire an image of the fiducial mark with the cameras of the mobile robot. In some applications, this may be useful if, for example, microfeatures in the construction surface would be useful at a later time to help navigate to the fiducial.

Also, in some applications, acquiring an image of the printed fiducial mark may be useful for quality control, to ensure at a later time that the fiducial mark was properly printed and not damaged by wind, dust, micro-debris, or other potential printing problems that may occur at a construction site. While the quality control could be done offline (e.g., at a much later time), optionally the mobile robot could perform a quality control check onsite to validate individual fiducials In decision block 825, a decision is made whether the printing of fiducials is complete. If the printing of fiducials is not complete, the process loops back to block 810. While the process may have a fixed number and arrangement of fiducials (e.g., 4 fiducials in a grid), more generally, there could be redundant fiducials (to account for potential printing problems) or additional alternate fiducial positions printed if printing problems are detected for one more printed fiducials. When all of the fiducial marks have been printed (and optionally have their images acquired), the process in block 830 saves the locations of fiducial marks and images for later use.

Figure 9:
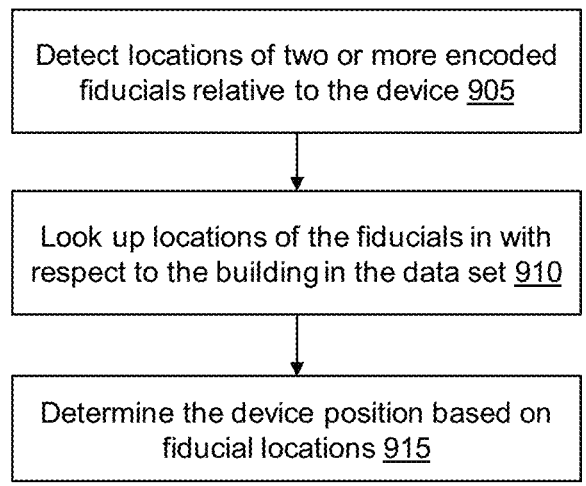
FIG. 9 is a flowchart of a method of detection location based on encoded fiducials in accordance with an embodiment.

The flowchart of FIG. 9 illustrates a method of location detected based on encoded fiducials. In this example, the device may be the mobile robot that printed the fiducials or another mobile device. In block 905, location of two or more encoded fiducials are detected relative to the device. In block 910, the location of the fiducials are looked up with respect to the building in a data set. In block 915, the device position is determined based on the fiducial locations.

In some embodiments, the mobile robot assesses the quality of the existing fiducials when it uses the fiducials for navigation. For example, the mobile robot may take a picture of a fiducial and then image analysis may be performed of the fiducial (e.g., by the mobile robot or be another entity receiving data from the mobile robot). For example, in a construction site there are many possible sources of degradation, depending on exposure to the elements, human foot traffic, etc. As the fiducials degrade over time, new ones are printed to maintain the ability to accurately navigate.

Fiducial Examples

In one implementation, the fiducial mark could include a large drawing such as an "X" which is used for gross (imprecise) positioning. After the "X" is printed the robot can take and store a picture of this marking, including the details in the cement or other flooring around the marking. When using this marking later for position both the "X" and the fine details of the surface surrounding the printed mark can be used for fine (precise) positioning.

In another implementation, the fiducial mark could be an April Tag. An April Tag is a visual fiducial system based on a near-optimal lexicographic coding system. They are sometimes described as being analogous to two-dimensional bar codes. However, they are designed to be detected in a manner that is robust to lighting conditions and view angle. They can be viewed from a farther distance away than some other types of fiducials. However, they also have a limited ability to encode information.

In some embodiments, at least two different types of fiducials are used. For example, April Tags have the advantage that they can be viewed from a distance but have potential limitations on the amount of information they encode and their ability to be used for fine navigation control. Other types of fiducials may be able to encode more information or provide finer control of robot position and orientation.

While the fiducials may be implemented in a manner visible to the naked human eye, more generally they may be implemented to be inconspicuous. For example, inks that fluoresce in ultraviolet light may be used to print the fiducials. Some or all of the fiducials may also be dispersed in a pseudo-random pattern that is easily recognizable by a computer vision system but either difficult to recognize or impossible to recognize by the naked human eye in view of the limitations of the human visual system, including the limitations of the eye and the manner in which the brain processes visual information. For example, a human observer standing above a construction surface may not notice variations in contrast or texture that a computer vision system is able to recognize.

In one embodiment, the mobile robot 104 generates and stores a map of printed fiducials, which may include a map showing the location of fiducials and their fiducial type. For example, a mobile robot may use the fiducial map to navigate to a fiducial, or set of fiducials, compare its location to the fiducial location, and determine any necessary fine correction to its location. For example, if a mobile robot generates an initial location information accurate to within some initial level of accuracy (e.g., a cm if the APD is unavailable), that may be sufficient to navigate to the location of the fiducial, which can then in turn be used to perform a fine correction of the location information to a much higher accuracy (e.g., a mm).

In another implementation, fiducials have already been placed in the environment before a mobile robot 104 is placed on site. A robot 104 could, using its onboard sensors, observe the location of these fiducials and, using information from an APD, calculate the location of these fiducials based on the absolute positioning information from the APD and where the fiducial appears relative to the robot's location. The robot could also be placed into one or more predetermined locations, find the locations of the fiducials around it, and calculate the precise locations of those fiducials based on its current position. Then, as it moves through the space it can use the fiducial location information as a reference to identify where it is.

Yet another problem with printing layout to a construction site is the presence of obstacles that block access to a portion of the flooring. These obstacles can include tools and materials that have been delivered or left out on the job site. However, another important type of obstacle are support structures used for the construction process. In a building using poured concrete, construction on the next floor of the building commences immediately after the current floor is finished. As soon as the concrete has set, materials for the next floor's formwork are brought onto the slab, and formwork is erected. After those materials are brought in for constructing the framework and walls in the floor. Typically, layout is performed after the support structures are removed, but when many materials and tools needed for the interior construction have already been delivered to the floor. To complete the layout, the layout crews may move these materials around as they mark the floor.

In one implementation, the robot is programed to mark the location of all penetrations and embeds. One way this can be accomplished is by printing alignment marks (like a "+" or an "X", or a line) over top of the feature, such that the center of the feature can be visually identified. This may also include text to denote what type of feature it is. For embedded features at the edge of the building, the robot can print marks on the interior indicating where the outline or major points of the embedded feature should be located. Using these printed marks, a human can later quickly determine if the features are located in the correct location. In another implementation, the robot will additionally take an image of the feature after the alignment marks have been printed, such that a remote operator can quickly determine if all the features are located correctly. In yet another embodiment, image recognition is used on a set of images taken at the location of the expected features including penetrations, or other embedded features, to determine if the features have been located properly. This may be performed independently or in combination with printing markings over the same features.

In one implementation the robot works around the areas that are physically inaccessible, but saves data indicating which portions of the layout have and have not been completed. Then at a later time, when supports have been removed, or when materials have moved around, the robot can revisit the site and print in the areas that were previously accessible. To accomplish this the robot can make use of QR codes that it printed onto the floor for precise localization without the need for a TS or APD.

Additional Printing and Fiducial Applications

Mobile printing robots can be used for other purposes in construction other than marking layout from digital building models. These additional applications may improve the efficiency of a construction project or enable other robots to effectively function in the space.

Quality control on a construction site is typically done by having workers follow checklists of steps to ensure that they have done their work correctly. These checklists may be stored on paper, displayed in mobile apps, or be memorized by more senior workers. In one implementation, a mobile printing robot 104 can be used to print such quality control checklists on the floor near where the work is being done, to remind workers of the correct process and convey the status of the project.

Framing and millwork contractors are responsible for framing walls and installing cabinetry in a building under construction. For example, where upper cabinets are to be hung in a kitchen, additional crosswise framing members must be installed to support the additional load of those cabinets on an interior wall. Architects and project managers typically communicate the desired plan through "elevations": 2D renderings of the finished cabinet installation, from different angles (e.g. facing front and top-down). These renderings are given to the workers, who must install the framing and cabinets in the correct configuration to match the drawings.

Furthermore, throughout the construction process, materials used for construction are delivered to each area that labor is being performed. These materials are generally assembled into numerous kits that each of the trades uses to finish the work for an area of the building. The coordination of assembling and delivering the kits is a manual process tracked on paper.

In one implementation, a mobile printing robot 104 is used to print such elevation drawings directly onto the floor near where the work is to be done, thus giving the crew the information they need to build correctly without having to search for that information onsite.

In another implementation, a mobile printing robot 104 is used to print part numbers (e.g. as printed text or as QR codes) next to parts that are to be installed, so that workers are able to see which part they are supposed to install where, thus reducing errors in building that can lead to costly rework.

In another implementation, a mobile printing robot 104 is used to print locations and kit number, aiding in the process of distributing and tracking construction materials.

Construction project managers, architects, and other stakeholders are generally required to walk the site periodically in order to see what progress has been made and catch any errors that occur during construction. These site walks consume significant time, sometimes incurring extensive travel time if the stakeholder is not located onsite. Solutions have been proposed that use portable devices (including cameras, drones, and mobile robots) to capture progress information and communicate this information to stakeholders without requiring them to pay an in-person visit. However, such systems generally require someone to identify the location of where a fault has occurred and manually mark it on a construction diagram. In one implementation, a mobile robot with onboard cameras and other sensors can navigate through the space and use fiducials printed on the ground by a mobile printing robot (either the same robot or a different model), in order to determine its location. A mobile robot that knows its location can then capture information about progress and link that information to a particular location in the building model. In one implementation, this information is added to the BIM model used by architects and other designers, so that the in-progress information is overlaid on top of the existing digital model for comparison.

Example of Printing Continuous Features

In one embodiment, a software extraction process identifies continuous features to be printed in a single pass. Examples include a wall segment, a line of text, or a marking indicating an electrical, plumbing, or HVAC feature. These continuous features are delivered to the robot separately to be printed in one continuous pass. For example, two perpendicular walls would be printed by printing the layout of one wall section in a first pass and then orienting and driving the robot in a perpendicular direction to print the next wall section.

To print one of these continuous features, a robot must navigate to the area where the printed feature starts and print while traveling to the area where the feature stops. These separate tasks are difficult to perform using a single navigation controller. This is particularly a problem for non-holonomic robot designs that do not have omni-directional drive systems. For example, a mobile robot with two-wheel differential drive has various limitations on its ability to navigate associated with the two-wheel differential drive and path planning and navigation.

However, printing requires high positional accuracy while path planning and navigation are typically performed with lower accuracy to allow operation on a discretized map of a tractable size. Path planning over large distances becomes intractable over a large space when the map is finely divided for accuracy.

In one embodiment, a robot uses two separate controllers 292 and 294 to perform the point to point navigation and the printing tasks. The point-to-point controller 292 performs path planning navigation. The line controller 294 performs line navigation during a single printing pass and during a transition region. Controller 295 thus makes a decision when to switch between the two different types of navigation.

Figure 10:
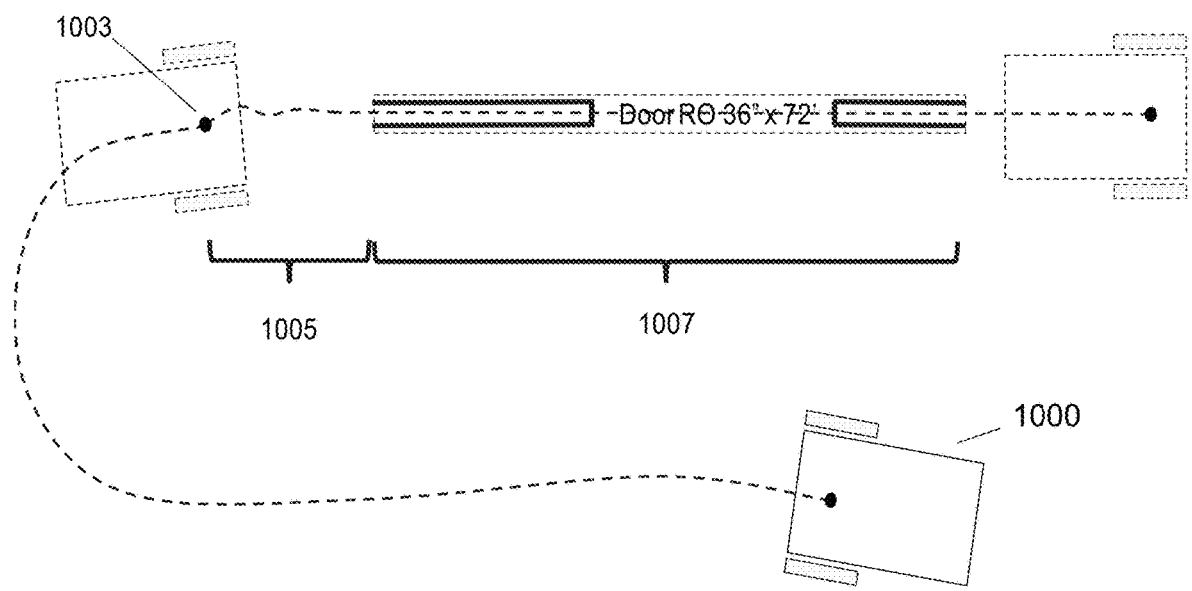
FIG. 10 illustrates aspects of a method of navigating and printing in accordance with an embodiment.

FIG. 10 shows the different stages of a method of robot navigating and printing a set of features in one continuous printing pass 1007. In the example used in FIG. 10, information is extracted from a CAD or BIM file to be printed in a single continuous pass 1007. FIG. 10 illustrates an example in which the extracted information consists of the wall outline for the bottom track of framing for two walls, a door frame location, and text indicating the door size. However, more generally the extracted information can be as simple as a continuous line, or as complex as a long image that is the same width as the print head. The information can also be represented in many different formats.

The mobile robot is moved from some initial position 1000 to a starting point 1003 using point-to-point navigation. There is then a transition to a line-following navigation. To compensate for the uncertainty in navigation, the starting point 1003 at which line navigation begins is located a preselected fixed distance 1005 before the start of the linear image, giving a line following controller time to converge before the print starts. As shown in FIG. 10, the starting point 1003 would typically not be perfectly aligned with the linear image. Once leaving the start point 1003, the path of the robot quickly converges onto the precise line in area 1005 before the point at which the robot starts printing on the ground in printing pass 1007.

Thus, the mobile robot is initially moved to a position 1003 that is offset from the starting point for printing a continuous pass. The corresponding offset distance can be selected empirically for a particular mobile robot design. For example, for a particular mobile robot design, a sequence of empirical tests can be used to determine how long a distance is required for a line-following navigation controller to converge to the intended starting point for printing with a selected degree of accuracy.

In one embodiment, the pre-selected distance 1005 could be made arbitrarily small (e.g., as small as a zero distance). For example, in one embodiment, the point-to-point navigation controller 292 is accurate enough to reach the starting point 1003 sufficiently close as to be aligned to the printing pass 1007 within the compensation range. In this case, the robot reaches the starting point 1003 (within the compensation range) and starts printing on the ground in printing pass 1007.

Figure 11:
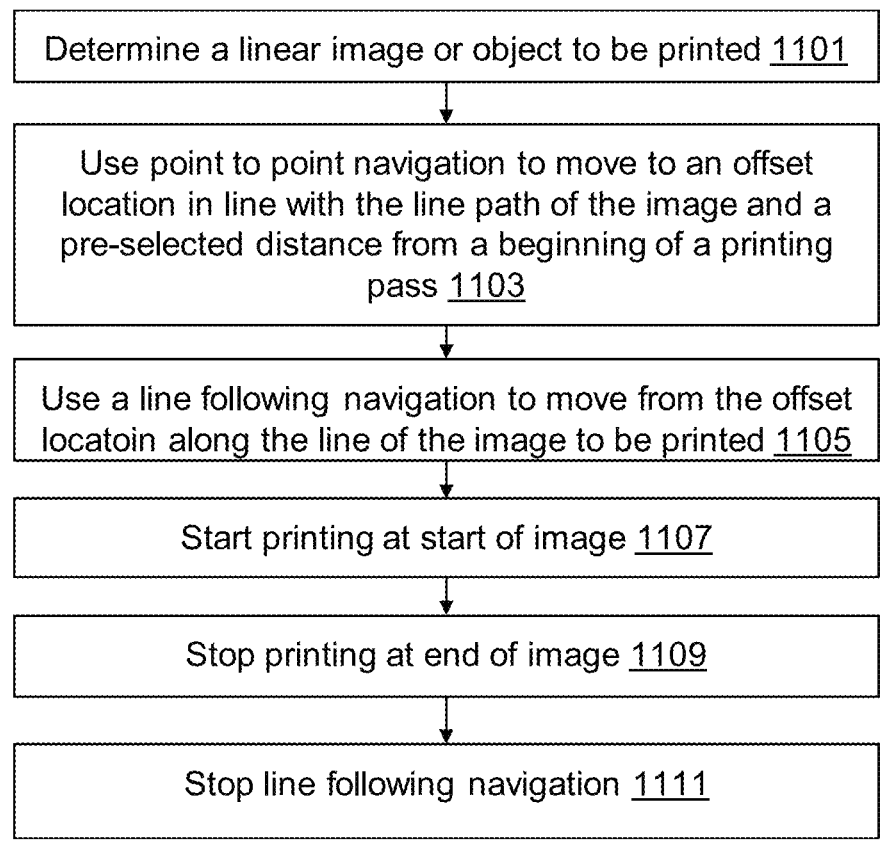
FIG. 11 is a flowchart of a method of navigating and printing in accordance with an embodiment.

The companion FIG. 11 shows a flowchart of the steps used in this method of printing. In step 1101, information is extracted from a CAD or BIM file for printing in one continuous pass.

For the purposes of explaining the concepts, we assume that the information is extracted and converted to an image to be printed as described in 1101. This linear image is no wider than the print head so it can be printed in a single pass.

Once the information to be printed is made available, the robot navigates to a start location in step 1103 using a point to point navigation controller. The robot path is indicated in the figure by a dashed line, and the start location is indicated in FIG. 10 by location 1003. Although the traversed distance shown in the figure is small, the robot may traverse a large distance to get to the starting point 1003. The traversal may include navigating around fixed obstacles such as pipes and columns, or temporary obstacles such as people. To plan the path any standard path planning algorithm may be employed, such as Dijkstra, A*, or sampling based planners such as RRT. These path planning algorithms use a grid size of 1 cm or larger to keep the search problem tractable over a large area. This results in a low accuracy of the start location that is approximately, but not precisely aligned with the image to be printed, as reflected in 1003.

Next, in step 1105, the robot activates the second controller to traverse from the start to the end of the image to be printed. This second controller is designed to follow a precise trajectory, in this case, a line. In one example, this line following controller may include a control loop (e.g., a proportional—integral—derivative (PID) controller) that steers the robot back to the line based on an error distance of the mobile robot from the line. However, any suitable high accuracy controller may be used that takes the robot on a path trajectory that allows the print elements to over the points to be printed. Furthermore, the controller may be designed to follow curves, arcs, splines, or any other precise shape.

Once the robot is at the point where the linear images starts, it begins to print the image as it moves along the ground in step 1107, and also shown in area 1007 in FIG. 10. When the end of the image is reached, the robot stops printing in step 1109 and then either comes to a stop, or simply stops the line following controller 1111 and switches back to the point to point controller and moves on to the next object to be printed.

Figure 12:
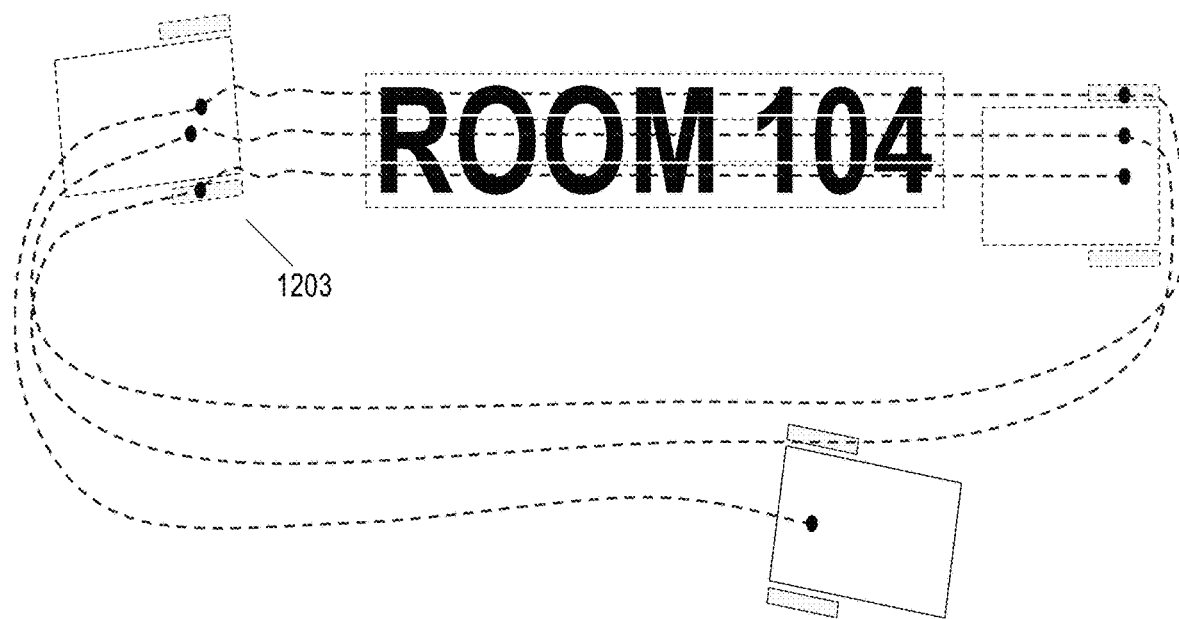
FIG. 12 illustrates aspects of a method of printing multi-line images in accordance with an embodiment.

To print images that are larger than the width of the print head, the robot needs to make multiple passes with the printhead. This is shown in FIG. 12 and the companion FIG. 13. In some implementations, the mobile robot prints an initial image strip and then, in subsequent printing passes, uses its cameras to use previously printed strip as an aid in determining its position and guiding the mobile printing robot along a line in which a subsequent printing pass is printed parallel with and adjacent to a previous printing pass. Alternatively, or in addition, the mobile robot could use previously printed fiducial marks to aid in coordinating the printing of a set of parallel linear image strips.

For the purposes of illustration, FIG. 12 illustrates an example with three linear image strips, although more generally an arbitrary number of linear image stripes could be printed. The three respective dashed lines illustrate the corresponding path taken by the mobile robot in three passes. The respective initial position 1203 of the mobile robot is shown as a dot.

Figure 13:
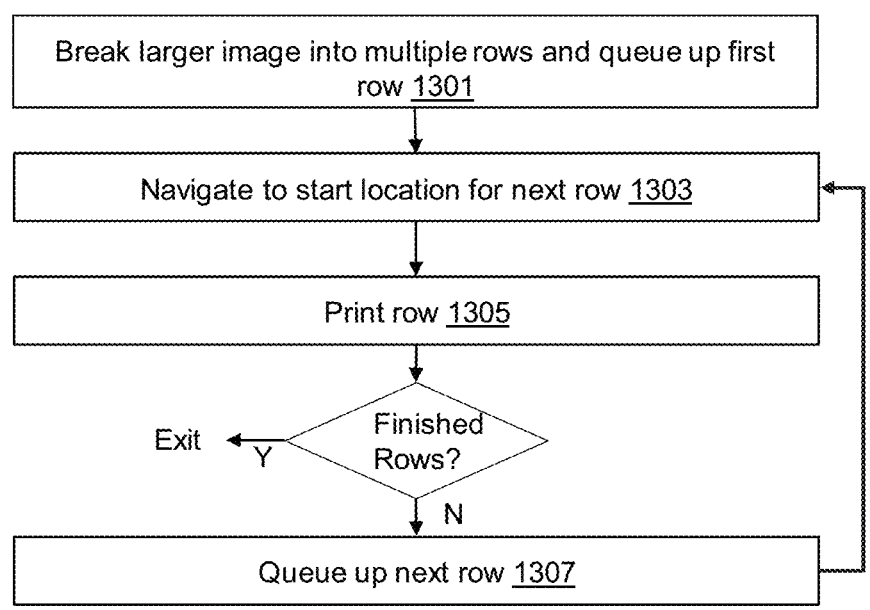
FIG. 13 is a flowchart of a method of printing multi-line images in accordance with an embodiment.

Referring to the flow chart of FIG. 13, In step 1301 an image wider than the print head is broken up into several linear image strips. In the particular example shown in FIG. 12, an image of large text "Room 104" is broken into 3 linear strips that combine together to create large letters. The first of these strips are queued up and ready for print. Then in 3 successive iterative printing passes, the robot navigates to each of the respective starting points for the next row in step 1303. Then the robot prints the row in step 1305 and queues up the next row in 1307. The process loops around until all of the row are printed.

Each of these 3 printing passes is performed in the same manner as shown in FIGS. 10 and 11, navigating to an initially start point that has low accuracy and is positioned a fixed distance that is offset a sufficient distance for the line controller to converge before the linear image printing starts. This is shown in FIG. 12, where the collection of start points are shown in area 1203. The corresponding robot path shows an area of convergence for each of the successive images before printing starts.

While three printing passes are illustrated, more generally a multi-line image may include two or more linear strips.

In an alternative approach, the robot uses the method described in FIGS. 10 and 11 to print the first line of the image. Then in successive lines of the same image, the robot navigates back to the precise starting point for the next line using a second line following controller and following a line that sits at a diagonal to the first line.

Nozzle Switching

In one embodiment, a mobile robot is designed with a printing component that enables fast control of the ink locations. In one embodiment, the printing system 216 includes an array of printing nozzles 217 in which a firing pattern can be selected in terms of a timing of which a set of nozzles print. Additionally or alternatively, the firing pattern can be a selection of a subset of printing nozzles to be used. For example, by selecting a different subset of printing nozzles, a printing line can be laterally shifted.

For example, an inkjet printer head could be used as a printing component. Such a printing component generally consists of a series of nozzles that emit ink, mounted linearly along the length of an assembly, and allowing for electrical actuation of individual print nozzles in the assembly. With the ability to turn on or off one or more print nozzles, a robot that is located with its center proximal to the location where a mark is to be made could electrically control the appropriate nozzles to cause a mark to be generated at the correct precise location.

In one embodiment, a robot contains an inkjet printing system having compensation inputs for both the velocity of the robot (the x position), and the transverse position of the robot with respect to the desired location of the printed features (the y position). When the y position changes, the firing sequence sent to the printheads is shifted proportionally, such that the image lands on the correct area of the floor.

In another embodiment, a robot print control system computes or receives information about the position of the robot with respect to the surface the robot is traveling on. The control system uses this information to fire each of the print head nozzles to produce an image on the ground in a specific location.

In another embodiment the robot has one or more nozzles mounted on high speed linear actuators, such that the frequency response of the positioning system moving the nozzles is high even though the robot is slow to correct its position.

Figure 14:
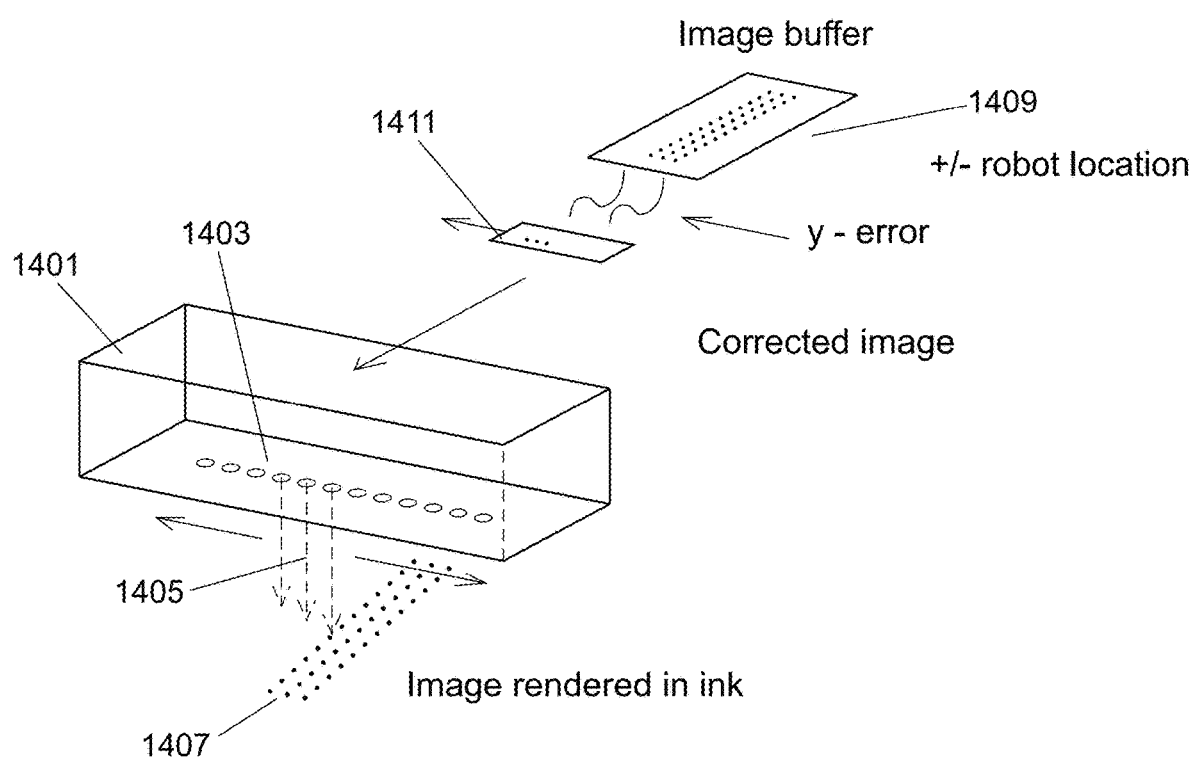
FIG. 14 illustrates aspect of lateral image compensation in accordance with an embodiment.

FIG. 14 shows how an image can be accurately printed on the ground using the nozzle shifting process. The input to the system is an image 1409 stored in memory (e.g., an image buffer) that is to be printed on the ground. In the example in the figure, the image consists of a line 3 pixels wide stored in a long array of bits. The figure also shows a print head 1401 containing an array of nozzles 1403, represented by circles in the figure. In this example, the array of nozzles has a total number of nozzles that is much greater than 3 pixels wide. As the robot travels in the forward direction, the active (selected) nozzles are throwing ink toward the ground as shown in 1405, forming one row 1407 of the image at a time.

In one embodiment, to ensure the image isn't distorted, the timing of the nozzle firing is synchronized with the forward motion of the robot. This is accomplished by either using the velocity of the robot to determine the firing frequency, or using the forward position of the robot to determine when to fire the next row of nozzles. In the latter case, a control system (e.g., controller 295) is monitoring the position of the robot. This position may come from the robot's wheel encoders, or it may be determined using data from an APD to either examine the current location of the robot or estimate the robot's position from past readings. More generally, the state estimator may generate an estimate of velocity or position (location and orientation) based on all available information. Every time the robot has moved a fixed distance, one row of the image is copied into a buffer and then transferred to the print head and used to determine which nozzles are fired.

As described earlier, to compensate for transverse motion of the robot with respect to the line or image to be printed, the nozzle firing pattern is also shifted. This magnitude of the shift is proportional to the traverse motion of the robot with respect to where the image should be placed on the ground, such that the image row lands in the correct location. To calculate the transverse shift, the robot may use APD data alone, or the fusion of APD data with other sensors such as an IMU, wheel odometry, optical position estimates. In the absence of APD data, sensor or image data from fiducials may be used to compute the location of the mobile robot. The position may be calculated by a state estimator that ingests all available sensor data and estimates the current position of the robot in terms of location and orientation (i.e., sensor fusion). Furthermore, both the robot's position and its orientation (the robot pose) may be used in conjunction to estimate the precise location of the printer above the ground.

As shown in FIG. 14, for each row to be printed, the information for that row 1411 is shifted based on the estimate of the printer's location over the ground. After shifting the row of pixels is transferred to the print head and printed on the ground. As may be clear by examining the shifting process, the pixels at the edge of the images are dropped when this happens, and therefore the size of the image that can be printed depends on both the head size and the expected magnitude of the transverse position error. This narrows the effective width of the print head. For example, for a print head that is 1" wide and the robot that is guaranteed to stay over the line within +/−½ inch the guaranteed print width is reduced to ½ inch.

Figure 15:
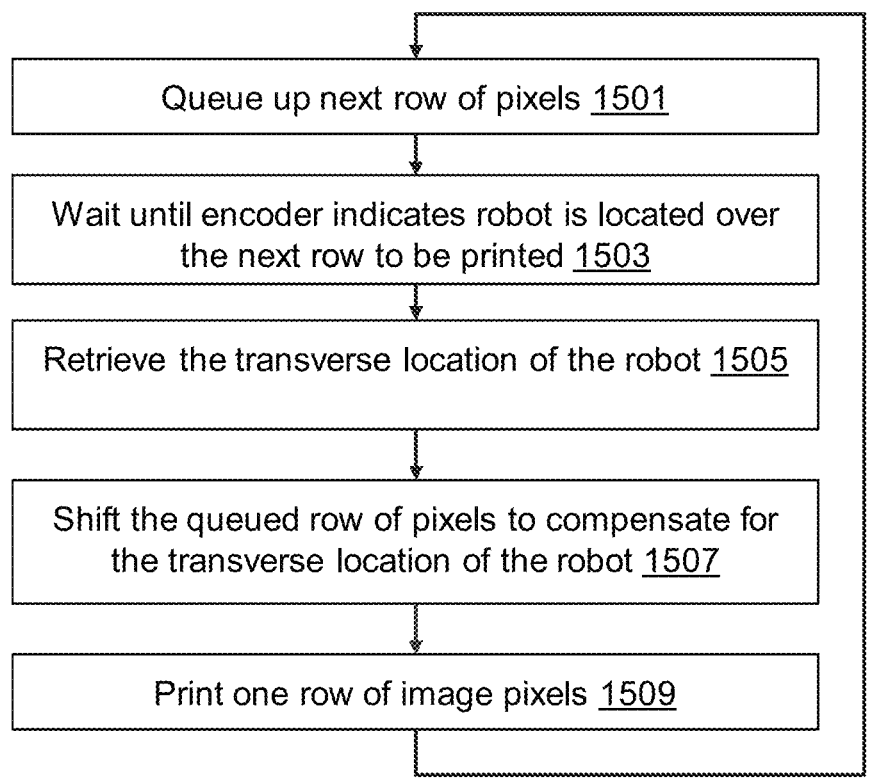
FIG. 15 is a flow chart of a method of lateral image compensation in accordance with an embodiment.

FIG. 15 shows a flowchart for adjusting the firing pattern to compensate for a transverse shift in the location of the mobile robot. In block 1501 the next row of pixels is taken from the image queued for printing. Then in block 1503 the system waits until the next row of pixels is ready to be printed. This can be accomplished by monitoring the robot's position, or by coupling the frequency of nozzle firing to the velocity. Then in block 1505 the position of the robot is acquired from the APD or state estimation. This information is used to calculate the transverse location of the print head with respect to the location where the image should be placed on the ground. For some robot configurations, it may be necessary to estimate both the position and orientation of the robot so that the position of the print head can be estimated. In some cases it may also be necessary to estimate the tilt angle or level of the floor to accurately calculate the position.

Then in block 1507, the queued row of pixels is shifted to line the image up with the correct position on the floor. For example, if the printer's location is determined to be ⅟₁₆ of an inch to the left of the image, the pixel image is shifted to the right by ⅟₁₆th of an inch, such that upon firing of the nozzles, the image appears at the correct position on the ground. Then finally in block 1109, the nozzles are fired, and the image appears on the ground.

As illustrated in FIG. 15, the process can loop until all of the rows of pixels are printed. One aspect of the process of FIG. 15 is that the timing of the print of each row of pixels can be independently synchronized with the movement of the mobile robot and also independently transversely shifted. This permits a mode of printing with improved accuracy.

Figure 16:
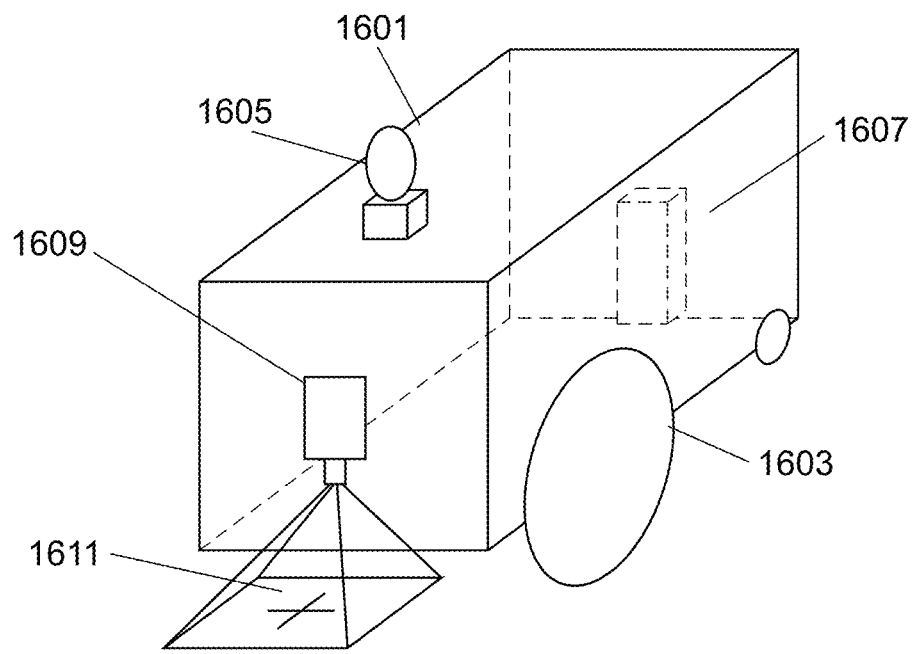
FIG. 16 illustrates an example of mobile robot utilizing fiducials in accordance with an embodiment.

FIG. 16 shows an example of a hardware configuration that can be used to print and measure locations of fiducials. The figure shows a mobile robot 1601 having a set of drive wheels 1603. To facilitate accurate positional information, a reflector 1605 is mounted onto the robot. The robot also includes a printer 1607 that can be used for printing information or fiducials on the ground. Finally, the robot has an optional camera 1609 that can be used to image a fiducial 1611 and obtain additional information on the precise location of the fiducial on the ground. In the particular example shown in the figure, the fiducial 1611 is depicted as having a cross shape, although any other type of fiducial such as QR codes, or April Tags may be used. Other components (not shown) may correspond to features described in regards to FIGS. 2 and 3.

Figure 17:
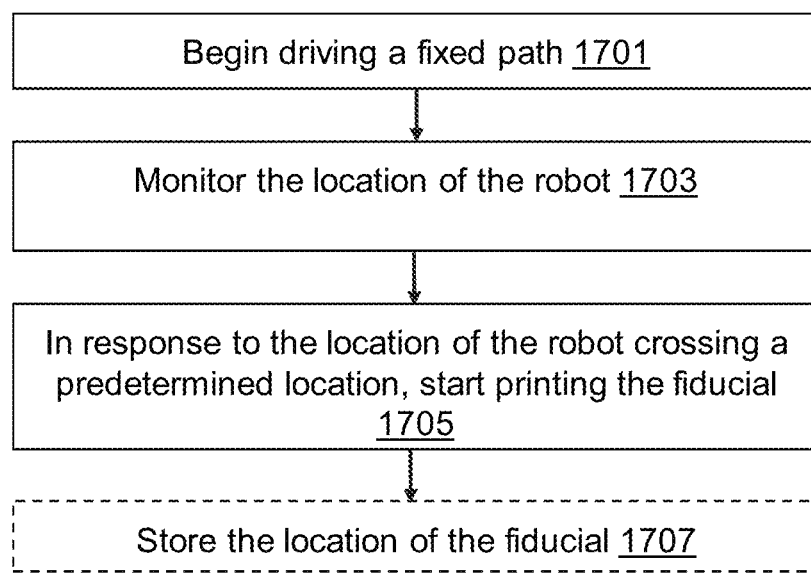
FIG. 17 is a flowchart of a method of marking fiducials in accordance with an embodiment.

FIG. 17 shows a flow chart for one embodiment of fiducial printing and detecting robot. In this example the robot is tasked with printing a fiducial in a particular location on the floor. The robot begins by driving down a fixed path that crosses over the desired position for the fiducial, 1701. While driving down the fixed path, the robot continually monitors its location 1703 as estimated by the state estimator. The state estimator may be implemented in a number of different ways, but in a preferred embodiment it would fuse position data from the APD with data from the other sensors to obtain an estimated location and orientation. Then, when the robot crosses the threshold of where the desired marking should be placed on the floor, it starts printing the fiducial in step 1705. Finally, in the optional step 1707, the robot stores the location of the fiducial along with the orientation that the robot had while printing the marking. This may also optionally include imaging the printed fiducial to accurately measure its position within an image.

Figure 18:
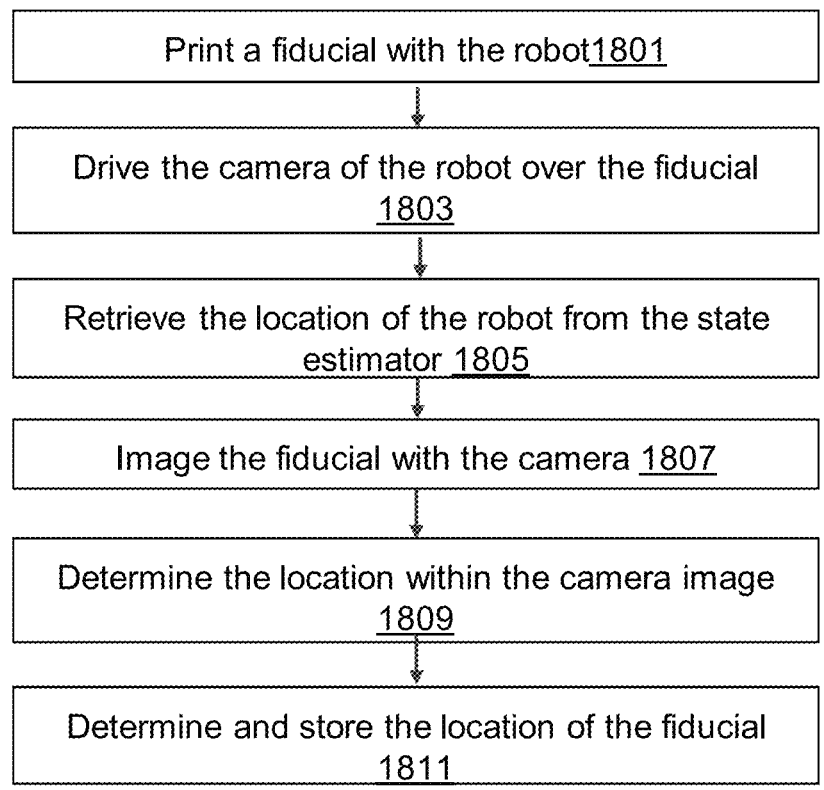
FIG. 18 is a flowchart of a method of marking fiducials in accordance with an embodiment.

In another embodiment, the robot has the capability to measure the precise location of the fiducials that were printed on the ground and record this information. This embodiment is depicted by the flowchart in FIG. 18. In step 1801, the robot prints a fiducial. For example, the robot may be driving and print a fiducial. Then in step 1803, the robot is driven such that the camera is over top of the fiducial. For example, the mobile robot is navigated/driven a sufficient distance such a camera of the mobile robot is over the top of the fiducial. At this point, the robot retrieves the estimate of its current location and orientation 1805 (e.g., from the state estimator), and acquires an image of the fiducial in 1807. Then in step 1809 it will determine the precise location of the fiducial using the current location and orientation of the robot, the location of the camera with respect to the robot's center, and the location of the fiducial within the camera image through the use of image recognition. This is but one example of how the location of the fiducial can be determined, but other techniques can be used. The net result is that the determination of the exact position of the fiducial as imaged by the robot will account for any inaccuracies during the navigating and printing process. Finally, in step 1811, the location and orientation of the fiducial is stored for later use.

One example of a device that can utilize fiducials is a projection system. In one embodiment, a projection system contains a depth camera, a projector, and a camera capable of locating fiducials and computing its position. By having both precise position information and 3D information about the structures around it, a projector could project the correct location of features that need to be installed onto the walls, ceiling, or studs. Some examples are the location of outlets, pipes, duct work, faucets, cabinets, etc. Another application for this same device is to project the location of hidden features on a wall. For example the location of rebar inside concrete floors and walls, or the location of pipes, HVAC, or electrical work inside walls and closed ceilings. This type of projector system could be a handheld device that is carried around the site and provides an x-ray view, or a view of plans to be built.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A mobile printing robot, comprising:
a mobile base having a drive section;
at least one local sensor to generate relative data for the mobile printing robot, wherein the relative data includes at least one of local position data generated by the mobile printing robot, robot velocity data generated by the mobile printing robot, and robot acceleration data generated by the mobile printing robot;
a wireless communication system configured to support a communication link with a total station for receiving time-sensitive position data from the total station;
a controller;
a reflector disposed on the mobile printing robot for the total station to determine an absolute position of the mobile printing robot with respect to the total station and provide absolute position information to the mobile printing robot via the communication link;
a printing system disposed in the robot body including an image buffer and at least one inkjet print head for the mobile printing robot to print images associated with a construction layout, the inkjet print head having an array of nozzles;
wherein the mobile printing robot generates an estimated most likely position based on the absolute position measurement data and the relative data;
wherein the controller during a printing pass selects a firing pattern and firing frequency for the array of nozzles based on at least in part on the estimated most likely position of the mobile printing robot to control a position location of features of the layout printed on a construction surface;
wherein the mobile printing robot prints images on the construction surface with an image position accuracy of at least ¼ inch; and
wherein the controller selects a firing pattern for the array of nozzles to shift pixels of the images to compensate for a transverse shift in the estimated most likely position of the mobile printing robot to control the position location of features of the construction layout printed on the construction surface.

2. The mobile printing robot of claim 1, wherein the mobile printing robot prints images including at least one member from the group consisting of lines and at least one of text, points, fiducials, and symbols.

3. The mobile printing robot of claim 1, wherein the reflector comprises a prism.

4. A mobile printing robot, comprising:
a mobile base having a drive section;
at least one local sensor to generate relative data for the mobile printing robot, wherein the relative data includes at least one of local position data generated by the mobile printing robot, robot velocity data generated by the mobile printing robot, and robot acceleration data generated by the mobile printing robot;
a wireless communication system configured to support a communication link with a total station for receiving time-sensitive position data from the total station;
a controller;
a reflector disposed on the mobile printing robot for the total station to determine an absolute position of the mobile printing robot with respect to the total station and provide absolute position information to the mobile printing robot via the communication link;
a printing system disposed in a robot body including an image buffer and at least one inkjet print head for the mobile printing robot to print images associated with a construction layout, the inkjet print head having an array of nozzles;
wherein the mobile printing robot generates an estimated most likely position based on the absolute position measurement data and the relative data;
wherein the controller during a printing pass selects a firing pattern and firing frequency for the array of nozzles based on the estimated most likely position of the mobile printing robot to control the position location of features of the construction layout printed on a construction surface;
wherein the mobile printing robot prints images on the construction surface with an image position accuracy of at least ¼ inch; and
wherein the mobile printing robot is further configured to implement a wait phase for the mobile printing robot to acquire and confirm the estimated most likely position of the mobile printing robot prior to printing at least one row of pixels.

5. The mobile printing robot of claim 4, wherein the mobile printing robot prints images including at least one member from the group consisting of lines and at least one of text, points, fiducials, and symbols.

6. The mobile printing robot of claim 4, wherein the images comprise continuous features printed during a printing pass.

7. The mobile printing robot of claim 4, wherein the reflector comprises a prism.

8. The mobile printing robot of claim 4, wherein the mobile printing robot tracks what portions of the layout have been printed.

9. The mobile printing robot of claim 4, wherein the at least one local sensor includes at least one of a depth camera, a lidar system, an Inertial Measurement Unit, wheel odometry, and a cliff detector.

10. A mobile printing robot, comprising:
a mobile base having a drive section;
at least one local sensor to generate relative data for the mobile printing robot, wherein the relative data includes at least one of local position data generated by the mobile printing robot, robot velocity data generated by the mobile printing robot, and robot acceleration data generated by the mobile printing robot;
a wireless communication system configured to support a communication link with a total station for receiving time-sensitive position data from the total station;
a controller;
a reflector disposed on the mobile printing robot for the total station to determine an absolute position of the mobile printing robot with respect to the total station and provide absolute position information to the mobile printing robot via the communication link; and
a printing system disposed in the robot body including an image buffer and at least one inkjet print head for the mobile printing robot to print images associated with a construction layout, the inkjet print head having an array of nozzles;
wherein the mobile printing robot generates an estimated position location of the mobile printing robot based on the absolute position measurement data and the relative data;
wherein the controller during a printing pass selects a firing pattern and firing frequency for the array of nozzles based on the estimated position location;
wherein the mobile printing robot prints images on a construction surface with an image position accuracy of at least ¼ inch; and
wherein the mobile printing robot is further configured to implement a wait phase for the mobile printing robot to acquire and confirm the estimated position location of the mobile printing robot prior to printing at least one row of pixels.

11. The mobile printing robot of claim 10, wherein the mobile printing robot prints images including at least one member from the group consisting of lines and at least one of text, points, fiducials, and symbols.

12. The mobile printing robot of claim 10, wherein the images comprise continuous features printed during a printing pass.

13. The mobile printing robot of claim 10, wherein the reflector comprises a prism.

14. The mobile printing robot of claim 10, wherein the mobile printing robot tracks what portions of the layout have been printed.

15. The mobile printing robot of claim 10, wherein the at least one local sensor includes at least one of a depth camera, a lidar system, an Inertial Measurement Unit, wheel odometry, and a cliff detector.

* * * * *